US011742509B2

(12) United States Patent
Ma et al.

(10) Patent No.: US 11,742,509 B2
(45) Date of Patent: Aug. 29, 2023

(54) ENERGY GENERATION FROM SALINITY GRADIENTS USING ASYMMETRICALLY POROUS ELECTRODES

(71) Applicant: University of Hawaii, Honolulu, HI (US)

(72) Inventors: Tianwei Ma, Honolulu, HI (US); Jian Yu, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 110 days.

(21) Appl. No.: 17/621,891

(22) PCT Filed: Jun. 23, 2020

(86) PCT No.: PCT/US2020/039089
§ 371 (c)(1),
(2) Date: Dec. 22, 2021

(87) PCT Pub. No.: WO2020/263800
PCT Pub. Date: Dec. 30, 2020

(65) Prior Publication Data
US 2022/0158216 A1    May 19, 2022

Related U.S. Application Data

(60) Provisional application No. 62/868,673, filed on Jun. 28, 2019.

(51) Int. Cl.
*H01M 8/22* (2006.01)
(52) U.S. Cl.
CPC .................. *H01M 8/227* (2013.01)
(58) Field of Classification Search
CPC .................................................. H01M 8/227
See application file for complete search history.

(56) References Cited

U.S. PATENT DOCUMENTS 7,736,791 B1 * 6/2010 Merz ................... H01M 50/457
429/50
11,502,322 B1 * 11/2022 Nana .................... H01M 8/227
(Continued)

FOREIGN PATENT DOCUMENTS

CN           105308317 A  *  2/2016  ............ F03G 7/00
EP           3263896 A1  *  1/2018  ............ B01D 61/00
(Continued)

OTHER PUBLICATIONS

WO-2019088782-A1 English machine translation (Year: 2019).*
(Continued)

*Primary Examiner* — Ula C Ruddock
(74) *Attorney, Agent, or Firm* — Withrow & Terranova, P.L.L.C.; Vincent K. Gustafson

(57) ABSTRACT

Disclosed herein is a system and method for energy generation from salinity gradients using asymmetrically porous electrodes. In certain embodiments, an energy generation system includes at least one pair of asymmetrically porous electrodes positioned within a chamber in selective fluidic communication with a freshwater source (e.g., a river) and a saltwater source (e.g., an ocean). Asymmetry between a first average percent volume per unit pore-width of a first electrode and a second average percent volume per unit pore-width of a second electrode creates differing interfacial potentials between the first electrode and the second electrode when such electrodes are immersed in freshwater and saltwater. By cyclically immersing the electrodes in freshwater and saltwater, energy is harvested from Gibbs free energy from mixing saltwater and freshwater. Such a system does not require a membrane or an external charge source. Methods of generating energy using asymmetrically porous electrodes are also provided.

20 Claims, 15 Drawing Sheets

(56) References Cited

U.S. PATENT DOCUMENTS

| | | |
|---|---|---|
| 2010/0225199 A1 | 9/2010 | Qiao et al. |
| 2012/0052338 A1 | 3/2012 | Brogioli et al. |
| 2012/0135282 A1 | 5/2012 | La Mantia et al. |
| 2013/0146469 A1* | 6/2013 | Budaragin ............ H01M 8/243 205/334 |
| 2015/0072267 A1* | 3/2015 | Suss ...................... H01M 8/227 429/499 |
| 2019/0193029 A1* | 6/2019 | Hosein .................. H01M 8/188 |

FOREIGN PATENT DOCUMENTS

| | | | | |
|---|---|---|---|---|
| KR | 20190061332 A | * | 6/2019 | ............ C02F 1/441 |
| WO | 2018094256 A1 | | 5/2018 | |
| WO | WO-2019088782 A1 | * | 5/2019 | ........... B01D 61/422 |

OTHER PUBLICATIONS

KR-20190061332-A English machine translation (Year: 2019).*
CN-105308317-A English machine translation (Year: 2016).*
Brogioli, D. et al., "Exploiting the spontaneous potential of the electrodes used in the capacitive mixing technique for the extraction of energy from salinity difference," Energy & Environmental Science, vol. 5, Sep. 2012, The Royal Society of Chemsitry, 11 pages.
Brogioli, D., "Extracting Renewable Energy from a Salinity Difference Using a Capacitor," Physical Review Letters, vol. 103, Issue 5, Jul. 2009, American Physical Society, 4 pages.
Feng, J. et al., "Single-layer MoS2 nanopores as nanopower generators," Nature, vol. 536, Jul. 2016, Macmillan Publishers Limited, 16 pages.
Gao, X. et al., "Surface Charge Enhanced Carbon Electrodes for Stable and Efficient Capacitive Deionization Using Inverted Adsorption-Desorption Behavior," Energy & Environmental Science, vol. 8, No. 3, Jan. 2015, Royal Society of Chemistry, 14 pages.
Huang, J. et al., "A Universal Model for Nanoporous Carbon Supercapacitors Applicable to Diverse Pore Regimes, Carbon Materials, and Electrolytes," Chemistry, Voume 14, No. 22, Jul. 2008, pp. 6614-6626.
Roberts, A. et al., "Porous Carbon Spheres and Monoliths: Morphology Control, Pore Size Tuning and Their Applications as Li-Ion Battery Anode Materials," Chemical Society Reviews, vol. 43, Aug. 2014, Royal Society of Chemistry, pp. 4341-4356.
Yu, J. et al., "Exponential energy harvesting through repetitive reconfigurations of a system of capacitors," Communications Physics, vol. 1, No. 9, Mar. 2018, Springer Nature, 11 pages.
International Search Report and Written Opinion for International Patent Application No. PCT/US2020/039089, dated Sep. 2, 2020, 7 pages.

* cited by examiner

ENERGY GENERATION FROM SALINITY GRADIENTS USING ASYMMETRICALLY POROUS ELECTRODES

RELATED APPLICATIONS

This application is a 35 U.S.C. § 371 national phase filing of International Application No. PCT/US2020/039089 filed Jun. 23, 2020, and claims priority to U.S. Provisional Patent Application No. 62/868,673, filed Jun. 28, 2019, wherein the entire contents of the foregoing applications are hereby incorporated by reference herein in their entireties.

TECHNICAL FIELD

This disclosure relates to energy generation. In particular, the present disclosure relates to energy generation from salinity gradients.

BACKGROUND

Clean energy can be generated by mixing of saltwater (e.g., sea water, ocean water, etc.) and fresh water (e.g., river water) and harvesting the Gibbs free energy (may also be referred to as blue energy) produced therefrom. However, current methods of extracting such energy require membranes and/or an external power source. For example, pressure-retarded osmosis (PRO) and reverse electrodialysis (RED) may be used to extract Gibbs free energy from mixing saltwater and fresh water, but performance of these methods is limited by issues associated with the required membranes.

Other methods include cyclically immersing electrodes in saltwater and freshwater, but require an external charge (e.g., from a capacitor) to create a capacitance difference and drive a current between the electrodes.

There is a need to improve such systems and methods by removing any requirement of a membrane and/or an external charge source, such as to enhance operational flexibility and/or improved performance.

SUMMARY

Disclosed herein is a system and method for energy generation from salinity gradients using asymmetrically porous electrodes (e.g., electrodes that differ in mean pore width). In certain embodiments, an energy generation system includes at least one pair of asymmetrically porous electrodes positioned within a chamber in selective fluidic communication with a freshwater source (e.g., a river) and a saltwater source (e.g., an ocean). Asymmetry between a first average percent volume per unit pore-width of a first electrode and a second average percent volume per unit pore-width of a second electrode creates differing interfacial potentials between the first electrode and the second electrode when such electrodes are immersed in freshwater and saltwater. Accordingly, by cyclically immersing the electrodes in freshwater and saltwater, energy is harvested from Gibbs free energy from mixing saltwater and freshwater. Further, such a system does not require a membrane or an external charge source. Methods of generating energy using asymmetrically porous electrodes are also provided.

In one aspect, the disclosure relates to an energy generation system including a first fluid chamber and a first pair of asymmetrically porous electrodes. The first fluid chamber includes at least one first fluid inlet and a first fluid outlet. The at least one first fluid inlet is configured to be in selective fluidic communication with a first solution source of a first salinity and a second solution source of a second salinity that differs from the first salinity. The first pair of asymmetrically porous electrodes includes a first electrode and a second electrode. The first electrode is positioned within the first fluid chamber. The first electrode includes first nanopores of a first average percent volume per unit pore-width. The second electrode is positioned within the first fluid chamber. The second electrode includes second nanopores of a second average percent volume per unit pore-width that differs from the first average percent volume per unit pore-width. Asymmetry between the first average percent volume per unit pore-width and the second average percent volume per unit pore-width is configured to create differing interfacial potentials between the first electrode and the second electrode.

In certain embodiments, the first solution source comprises a saltwater source, and the second solution source comprises a freshwater source.

In certain embodiments, the energy generation system further includes a switching element to selectively complete an electrical circuit between the first electrode and the second electrode.

In certain embodiments, the energy generation system further includes a second pair of asymmetric porous electrodes connected in series to the first pair of asymmetric porous electrodes.

In certain embodiments, the energy generation system further includes a second fluid chamber including a second fluid inlet and a second fluid outlet. The second fluid inlet is configured to be in selective fluidic communication with the first solution source and the second solution source.

In certain embodiments, the first electrode comprises graphite on a substrate of a first polymeric material and comprises a binder of a second polymeric material.

In certain embodiments, the first electrode and the second electrode each comprise carbon materials of average pore widths between 0.5 nm and 33 nm.

In certain embodiments, the first electrode and the second electrode each include carbon materials of average pore widths larger than a first Debye length of a first solution from the first solution source and smaller than a second Debye length of a second solution from the second solution source.

In certain embodiments, the first solution comprises saltwater, and the second solution comprises freshwater.

In certain embodiments, the first pair of asymmetrically porous electrodes are not in electrical communication with an external charge source.

In another aspect, the disclosure relates to a method of energy generation. The method includes immersing a first pair of asymmetrically porous electrodes into a first solution of a first salinity. The method further includes harvesting electricity from differing interfacial potentials between a first electrode and a second electrode of the first pair of asymmetrically porous electrodes from differing average percent volume per unit pore-widths between the first electrode and the second electrode from the first solution. The method further includes immersing the first pair of asymmetric porous electrodes into a second solution of a second salinity that differs from the first salinity. The method further includes harvesting electricity from differing interfacial potentials between the first electrode and the second electrode from differing average percent volume per unit pore-widths between the first electrode and the second electrode from the second solution.

In certain embodiments, the first solution includes saltwater, and the second solution source includes freshwater.

In certain embodiments, the method further includes opening at least one fluid inlet of a fluid chamber to receive the first solution within the fluid chamber. The first solution includes saltwater. The method further includes opening a fluid outlet of the fluid chamber to expel the first solution from the fluid chamber. The method further includes opening the at least one fluid inlet of the fluid chamber to receive the second solution within the fluid chamber. The second solution includes freshwater. The method further includes opening the fluid outlet of the fluid chamber to expel the first solution from the fluid chamber.

In certain embodiments, the method further includes closing a switching element, after immersing the first pair of asymmetric porous electrodes into the first solution, to complete an electrical circuit between the first electrode and the second electrode to harvest electricity from the differing interfacial potentials from the first solution. The method further includes opening the switching element, before immersing the first pair of asymmetric porous electrodes into the second solution. The method further includes closing the switching element, after immersing the first pair of asymmetric porous electrodes into the second solution, to complete the electrical circuit between the first electrode and the second electrode to harvest electricity from the differing interfacial potentials from the second solution.

In certain embodiments, immersing the first pair of asymmetric porous electrodes in the first solution further includes immersing a second pair of asymmetric porous electrodes in the first solution. The second pair of asymmetric porous electrodes are connected in series to the first pair of asymmetric porous electrodes. Further, immersing the first pair of asymmetric porous electrodes in the second solution further includes immersing the second pair of asymmetric porous electrodes in the second solution.

In certain embodiments, the method further includes cyclically repeating the steps of immersing the first pair of asymmetric porous electrodes in the first solution, harvesting electricity from the first solution, immersing the first pair of asymmetric porous electrodes in the second solution, and harvesting electricity from the second solution.

In certain embodiments, the first electrode includes graphite on a substrate of a first polymeric material and includes a binder of a second polymeric material.

In certain embodiments, the first electrode and the second electrode each comprise carbon materials of average pore widths between 0.5 nm and 33 nm.

In certain embodiments, the first electrode and the second electrode each include carbon materials of average pore widths larger than a first Debye length of a first solution from the first solution source and smaller than a second Debye length of a second solution from the second solution source.

In certain embodiments, the first solution includes saltwater, and the second solution includes freshwater.

In certain embodiments, the first pair of asymmetrically porous electrodes are not in electrical communication with an external charge source.

In another aspect, any one or more aspects or features described herein may be combined with any one or more other aspects or features for an additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

DETAILED DESCRIPTION

Figure 1A:
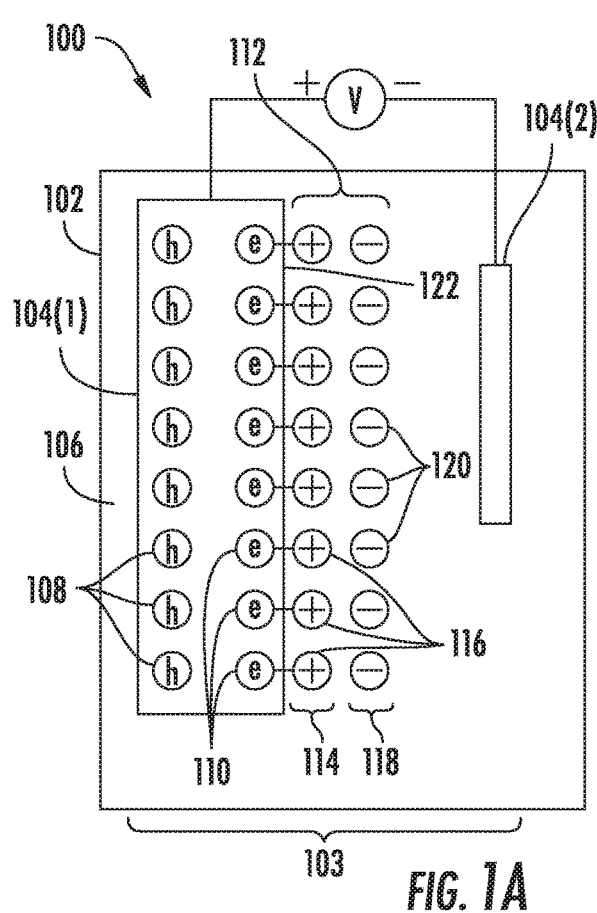
FIG. 1A is a schematic diagram of an electrical double layer (EDL) spontaneously forming at the interface between an electrode and a solution.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed herein is a system and method for energy generation from salinity gradients using asymmetrically porous electrodes (e.g., electrodes that differ in mean pore width). In certain embodiments, an energy generation system includes at least one pair of asymmetrically porous electrodes positioned within a chamber in selective fluidic communication with a freshwater source (e.g., a river) and a saltwater source (e.g., an ocean). As used herein, the term "asymmetrically porous" as applied to two electrodes refers to a condition in which the electrodes differ in average (e.g., mean) pore width, preferably to a sufficient degree that such electrodes permit establishment of differing interfacial potentials therebetween when immersed in solutions of differing salinity. Asymmetry between a first average percent volume per unit pore-width of a first electrode and a second average percent volume per unit pore-width of a second electrode creates differing interfacial potentials between the first electrode and the second electrode when such electrodes are immersed in freshwater and saltwater. Accordingly, by cyclically immersing the electrodes in freshwater and saltwater, energy is harvested from Gibbs free energy from mixing saltwater and freshwater. Further, such a system does not require a membrane or an external charge source. Methods of generating energy using asymmetrically porous electrodes are also provided.

In certain embodiments, the energy generation system is configured to harvest energy from water salination (i.e., blue energy) using asymmetrically porous electrodes. In other words, the energy generation system is configured to harvest Gibbs energy from salinity gradients produced by mixing seawater and river water, which may serve as a source of clean energy. In certain embodiments, the nanopore-size effect of carbon materials is used to create differential responses of electrical double layers when under a salinity gradient, leading to a potential difference between two electrodes. In certain embodiments, pores with characteristic widths smaller than the Debye length in a solution impose a strong, pore-size dependent effect on the interfacial potential associated with the electrical double layers (EDLs) that spontaneously form within the pores. When the electrodes are successively immersed in solutions of various salinity concentrations, a concentration gradient is created between the solution captured in the pore and that in the ambient solution. The nanopore-size effect leads to different responses of the EDLs on each electrode from the mixing of these two solutions, producing an electrical potential difference between the electrodes.

Referring to FIG. 1A, disclosed is an energy generation system 100 including a chamber 102 and a pair 103 of asymmetrically porous electrodes 104(1), 104(2) positioned in the chamber 102 and immersed in an electrolyte solution 106 (e.g., sodium chloride (NaCl)). The first electrode 104(1) is discussed in detail below with the second electrode 104(2) serving as the reference electrode. However, it is noted that many of the features described with respect to the first electrode 104(1) also apply to the second electrode 104(2). Each electrode 104(1), 104(2) includes one or more pores that may be at a surface of the electrode 104(1), 104(2). In certain embodiments, the electrodes 104(1), 104(2) include surface porosity such that only a portion of the electrodes 104(1), 104(2) include pores. In certain embodiments, electrodes 104(1), 104(2) include a bulk porosity such that the pores permeate throughout the electrodes 104(1), 104(2). Further, in certain embodiments the pores are nanopores and have an average pore width between 0.5 nm and 33 nm. The electrodes 104(1), 104(2) may be manufactured in a variety of ways. Further, in certain embodiments, the electrodes 104(1), 104(2) are carbon electrodes (e.g., graphene). In certain embodiments, the electrodes 104(1), 104(2) comprise composite electrodes of multiple materials (e.g., substrate and graphene).

The first electrode 104(1) includes a charge depletion region 108 at one side of the first electrode 104(1), electrons 110 at the other side of the first electrode 104(1), and an electrical double-layer (EDL) 112. The charge depletion region 108 is an insulating region where mobile charge carriers have been diffused away.

The EDL 112 includes a first layer 114 (e.g., of sodium cations (Na$^+$) 116) and a second layer 118 (e.g., of chloride anions (Cl$^-$) 120). The EDL 112 spontaneously forms at an interface 122 of the electrolyte solution 106 (e.g., NaCl solution) and a solid, electrically neutral conductor (e.g., the first electrode 104(1)), giving rise to an interfacial potential. The EDL 112 includes two parallel layers 114, 118 of charge that appear on a surface of an object (e.g., the first electrode 104(1)) when exposed to a fluid (e.g., the solution 106) due to a variation of electrical potential near a surface. In particular, the first layer 114 (i.e., surface charge) may be either positive or negative and includes ions absorbed onto the object due to chemical interactions. The second layer 118 (i.e., diffuse layer) includes ions attracted to the first layer 114 by a Coulomb force.

The interfacial potential may be expressed as:

$$\psi = \frac{\sigma}{C/A'} \quad (1)$$

where $\psi$ is the interfacial potential, $\sigma$ is the density of the surface charge in the electrode 104(1) that contributes to the formation of the EDL 112, C is the integral capacitance of the EDL 112, and A is the specific surface area of the interface 122. For example, at the interface 122 of a carbon electrode 104(1) and a sodium chloride solution 106, sodium ions 116 are more likely to adhere to the surface due to their higher adsorption energy, attracting the negative charges (e.g., electrons 110) in the electrode 104(1) to form an EDL 112. The specific capacitance of the EDL 112 is commonly modeled as $C/A = \epsilon_r \epsilon_0 / d$ where $\epsilon_r$ is the electrolyte dielectric constant, $\epsilon_0$ is the permittivity of vacuum, and d is the effective thickness of the EDL 112, which is usually considered as the Debye length.

The Debye length is a measure of a charge carrier's net electrostatic effect in a solution and how far its electrostatic effect persists. In other words, the Debye length depends on the solution. A Debye sphere is a volume with a radius defined by the Debye length. A charge carrier (e.g., electrons, ions) is a particle that is free to move and carries an electrical charge.

Figure 1D:
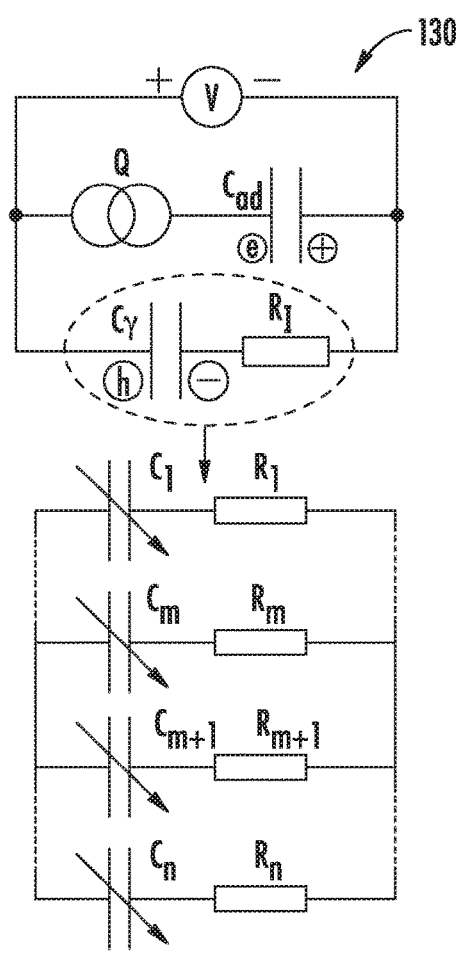
FIG. 1D is a circuit model illustrating the response of a porous electrode to a solute (e.g., ion) concentration gradient.
Figure 1B:
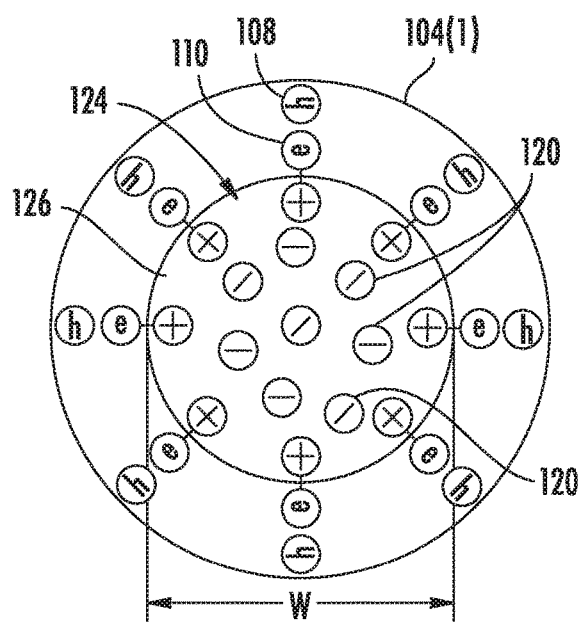
FIG. 1B is a diagram illustrating an EDL formed within a nanopore of the electrode of FIG. 1A immersed in a concentrated solution.
Figure 1C:
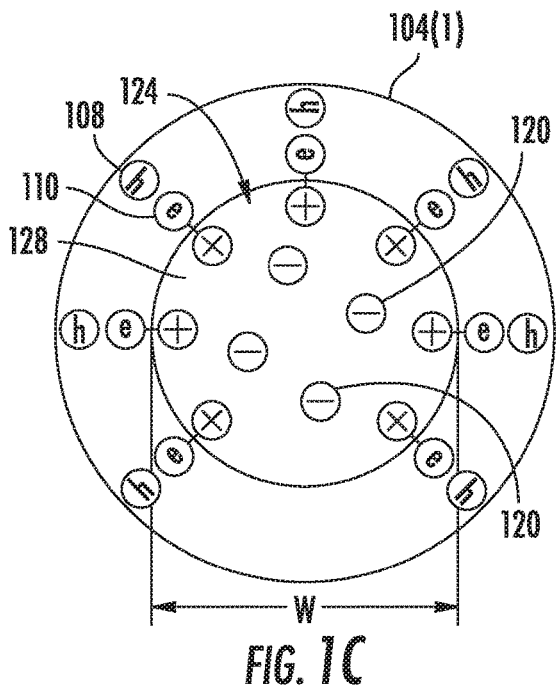
FIG. 1C is a diagram illustrating an EDL formed within the nanopore of FIG. 1B when immersed in a dilute solution.

Referring to FIGS. 1B-1C, the EDL 110 associated with a nanoporous electrode 104(1) includes portions of the EDLs 110 within the nanopores 124 of different sizes. A strong pore-size effect appears to exist, leading to significant structural changes in the EDLs 110, which influence the overall response of the system to a concentration gradient. For example, FIGS. 1B-1C illustrate a nanopore 124 with a width W (or diameter) between a first Debye length in a concentrated solution and a second Debye length in a dilute solution, respectively. The EDL 110 within the nanopore 124 undergoes a structural change when subjected to a concentration gradient. A concentration refers to how much of a solute (i.e., a minor component in a solution that is dissolved) there is compared to a solvent (i.e., a major component in a solution that dissolves). A concentration gradient occurs when a solute is more concentrated in one area than another. Solutes move from areas of higher concentration to lower concentration to produce an equal concentration throughout the solution.

Referring to FIG. 1B, when the nanopore 124 is immersed in a concentrated first solution 126, the EDL 110 fits in the nanopore 124. Referring to FIG. 1C, when the nanopore 124 is then immersed in an ambient dilute solution 128, the Debye length increases due to the mixing of the solution in the nanopore 124 with the ambient solution. Some anions 120 are expelled from the nanopore 124 due to the space constraint. Such structural change of the EDL 110 is pore-size dependent and leads to further reduction of specific capacitance in addition to that from the increased Debye length alone. A smaller nanopore 124 will expel more anions 120, leading to a greater reduction of specific capacitance.

As shown in equation (1) above, the reduction of capacitance tends to increase the interfacial potential, while decreasing concentration reduces the amount of adsorbed ions, which tends to decrease the interfacial potential. The final interfacial potential is the result of these two competing mechanisms. For a flat surface, the concentration-dependent ion adsorption is usually dominant, leading to a decreasing interfacial potential with decreasing concentration. For a porous electrode, however, the nanopore-size effect may be sufficiently strong to be the dominant mechanism leading to an increasing interfacial potential.

FIG. 1D is a circuit model 130 illustrating the response of a porous electrode 104(1) to a solute (e.g., ion) concentration gradient. Consider two concentrations, $c_1$ and $c_2$ ($c_1 > c_2$), with Debye lengths $\lambda_{D1}$ and $\lambda_{D2}$ ($\lambda_{D1} < \lambda_{D2}$), respectively. The two capacitors, $C_{ad}$ and $C_r$, respectively represent the contributions from the adsorbed ions and the rest of the EDL 110. The concentration-dependent charge source, Q(c), represents the spontaneous adsorption of the ions to the surface. Capacitor $C_r$ is further modeled as variable capacitors connected in parallel, with every capacitor representing that portion of the EDL 110 in every nanopore 124. More specifically, $C_1 \ldots C_m$ represent the EDLs 110 in nanopores 124 smaller than the Debye length in the dilute solution, $\lambda_{D2}$, and $C_{m+1} \ldots C_n$ represent those in nanopores 124 larger than $\lambda_{D2}$. Because pore sizes affect only $C_1 \ldots C_m$, the nanopore-size effect may become significant when a large amount of nanopores 124 are of widths smaller than $\lambda_{D2}$, i.e., when $\Sigma_{i=1}^{m} C_i$ is comparable to or greater than $\Sigma_{j=m+1}^{n} C_j$. A weighted average pore-width is defined as $\overline{w} = \Sigma_{i=1}^{m} w_i \phi_i / \overline{\phi}$, where $w_i$ and $\phi_i$ represent the width and percent volume of the $i^{th}$ pore, respectively, and $\overline{\phi} = \Sigma_{i=1}^{m} \phi_i \leq 1$ represents the total percent volume of these pores. The average percent volume per unit pore-width is defined as $\tau = \overline{\phi}/\overline{w}$ as a qualitative measure of the size effect. A larger value of $\tau$ indicates a stronger nanopore-size effect.

Figure 2A:
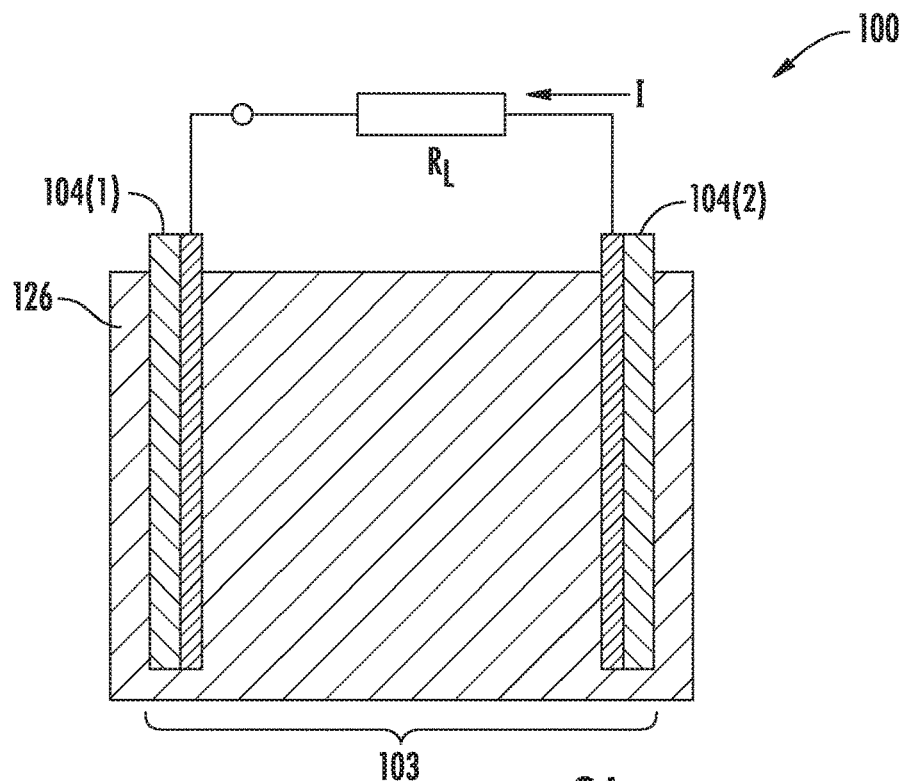
FIG. 2A is a diagram illustrating electrical flow when a pair of asymmetrically porous electrodes of an energy generation system are placed in saltwater.
Figure 2B:
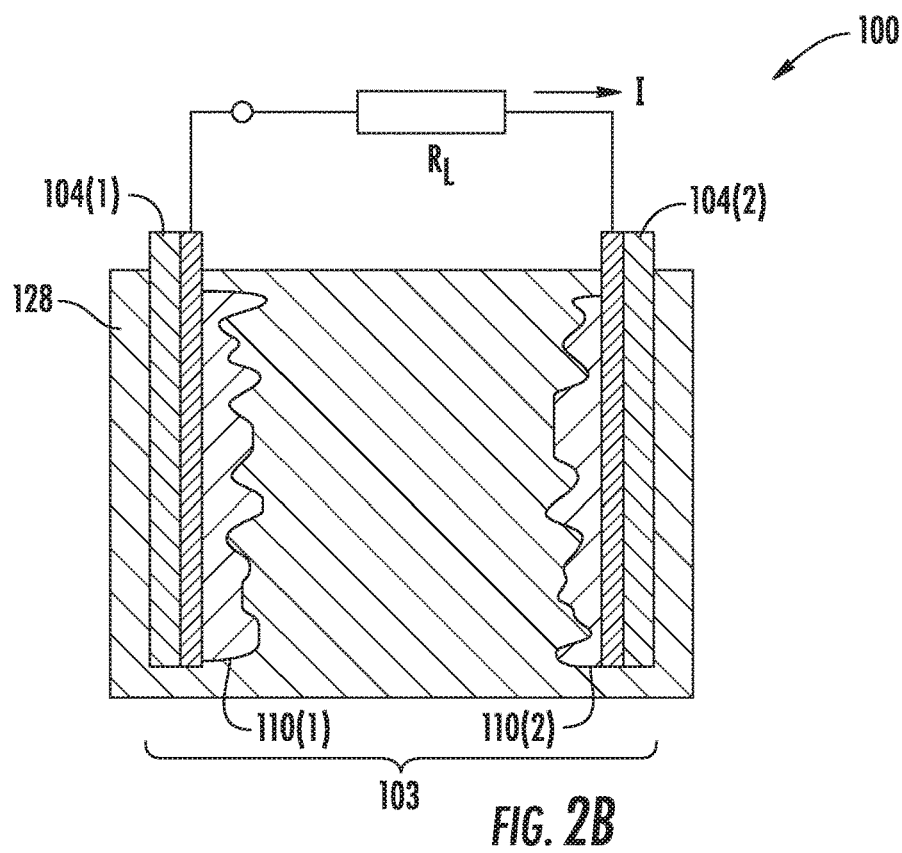
FIG. 2B is a diagram illustrating electrical flow when the pair of asymmetrically porous electrodes of FIG. 2A are placed in fresh water.

Referring to FIGS. 2A-2B, the energy generation system 100 uses a pair 103 of electrodes 104(1), 104(2) with asymmetric nanopore-size distributions to harvest Gibbs free energy, such as by immersing the electrodes 104(1), 104(2) successively in solutions of various concentrations. In certain embodiments, the first electrode 104(1) includes first nanopores of a first average percent volume per unit pore-width, and the second electrode 104(2) includes second nanopores of a second average percent volume per unit pore-width that differs from the first average percent volume per unit pore-width. In certain embodiments, the first electrode 104(1) has an average pore size and between 0.1 nm and 6 nm, between 0.5 and 3 nm, or between 0.6 and 2.4 nm and an average percent volume between 10 and 50%, between 10 and 40%, or between 15 and 37%. In certain embodiments, the second electrode 104(2) has an average pore size between 0.1 and 10 nm, between 0.5 and 9 nm, or between 0.8 and 7.2 nm and an average percent volume between 0.1 and 20%, between 0.5 and 15%, or between 0.5 and 10%. In certain embodiments, the average percent volume per unit width for the first electrode 104(1) is between 10 and 40 or between 20 and 30, and the average percent volume per unit width for the second electrode 104(2) is between 0.1 and 3 or between 0.5 and 2.

The electrodes 104(1), 104(2) are first immersed in a first solution 126 with a concentration $c_1$ and then in an ambient dilute solution 128 with a concentration $c_2$. The Gibbs free energy from the mixing of the first solution 126 captured in the pores ($c_1$) and the ambient dilute solution 128 ($c_2$) is harvested through the potential difference between the electrodes 104(1), 104(2) as the result of asymmetric nanopore-size distributions. Energy is then delivered to an external load $R_L$ and the potential difference is eliminated. For simplicity, assume the volume of the ambient dilute solution 128 is much larger than the total volume of the nanopores 124 so that the concentration is that of the bulk solution after mixing. The electrodes 104(1), 104(2) are then immersed in solution $c_1$ so that mixing of the solutions in the nanopores 124 (now with $c_2$) and the bulk ($c_1$) generates an opposite potential difference. The process can be repeated to continue harvesting energy. As this method is based on EDLs 110 that spontaneously form at the interface 122, there is no need for an external charge source nor is there any need for a membrane.

In certain embodiments, one cycle of the process starts with the electrodes 104(1), 104(2) being immersed in the first solution 126 (may be referred to herein as the seawater stage). The capacitance of the EDL 110(1) at a first electrode 104(1) increases more significantly than that of the EDL 110(2) at the second electrode 104(2), causing the potential of the first electrode 104(1) to drop more than that of the second electrode 104(2). Upon closing the circuit by switch S, a current I flows through the external load $R_L$ from the second electrode 104(2) to the first electrode 104(1) across the solution.

After the discharging process, the circuit is switched open by the switch S and the electrodes 104(1), 104(2) are then immersed in the ambient dilute solution 128 (may be referred to herein as the river-water stage). The mixing of the first solution 126 in the nanopores 124 with the ambient dilute solution 128 reduces the capacitance of the EDL 110(1) at the first electrode 104(1) more than it does to the EDL 110(2) at the second electrode 104(2), resulting in a higher electrical potential on the first electrode 104(1). A current I in the opposite direction is generated when the circuit is closed by the switch S.

In the seawater stage, at time $t_1$ after mixing starts while the circuit stays open, the surface charge densities of the electrodes 104(1), 104(2) are respectively $\text{ma}_{a0}$ and $\sigma_{f0}$ and the capacitances are $C_a$ and $C_f$, respectively. The circuit is closed for a sufficiently long time $t_{dis,1}$, so that the charge redistributes, releasing energy $E_{d1}=\tfrac{1}{2}C(\psi_f-\psi_a)^2$, where $\psi_a=\sigma_{a0}/C_a$, $\psi_f=\sigma_{f0}/C_f$, and $C=C_aC_f/(C_a+C_f)$. The circuit is then opened and the process enters the river-water stage after the electrodes are immersed in the ambient dilute solution 128. The total charge reduces due to the lower concentration. Assume that the surface charge densities are $\sigma'_{a0}=\eta\sigma_{a0}$ and $\sigma'_{f0}=\eta\sigma_{f0}$, respectively, where $0<\eta<1$. At time $t_2$ after the mixing, the capacitances become $C'_a$ and $C'_f$, respectively. Similarly, the system 100 discharges for a sufficiently long time ($t_{dis,2}$), releasing energy $E_{d2}=\tfrac{1}{2}C'(\psi'_f-\psi'_a)$, where $\psi'_a=\sigma'_{a0}/C'_a$ and $\psi'_f=\sigma'_{f0}/C'_f$, and $C'=C'_aC'_f/(C'_a+C'_f)$.

Figure 3A:
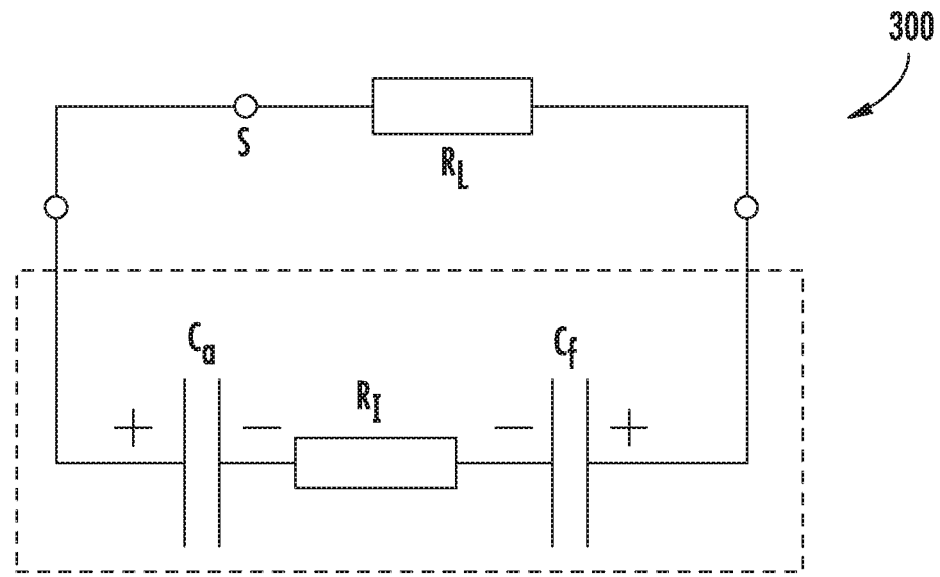
FIG. 3A is a simple circuit diagram of the energy generation system of FIGS. 2A-2B.
Figure 3B:
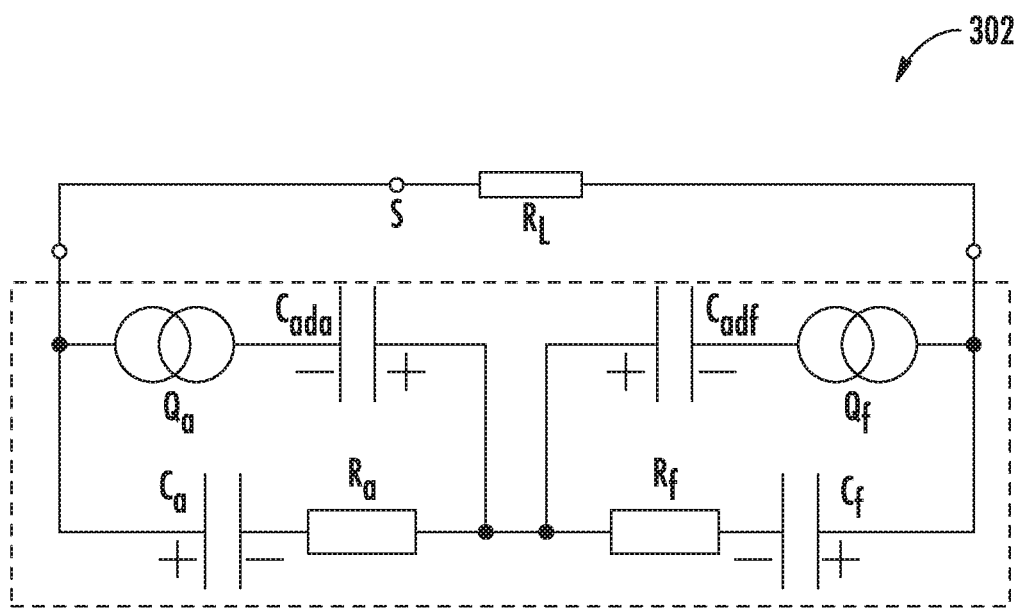
FIG. 3B is a complex circuit diagram of the energy generation system of FIGS. 2A-2B.

FIGS. 3A-3B are circuit diagrams modeling the energy generation system 100 of FIGS. 2A-2B. FIG. 3A is a simple circuit diagram 300 of the energy generation system 100 of FIGS. 2A-2B. The energy generation system 100 can be modeled as an RC system. The double layers at the electrodes 104(1), 104(2) are modeled as two capacitors repetitively charging each other. Capacitors $C_a$ and $C_f$ represent the first electrode 104(1) and second electrode 104(2), respectively. More specifically, the capacitances of the capacitors vary with the concentration gradient so that a potential difference is generated between the capacitors in each stage. FIG. 3B is a complex circuit diagram 302 of the energy generation system 100 of FIGS. 2A-2B. The circuit diagram 302 incorporates features of the circuit diagram of FIG. 1D, and includes the concentration dependent charge source $Q_a$ and $Q_f$ of the first and second electrodes 104(1), 104(2), which represents the spontaneous adsorption of the ions to the surface of the first and second electrodes 104(1), 104(2).

Figure 4A:
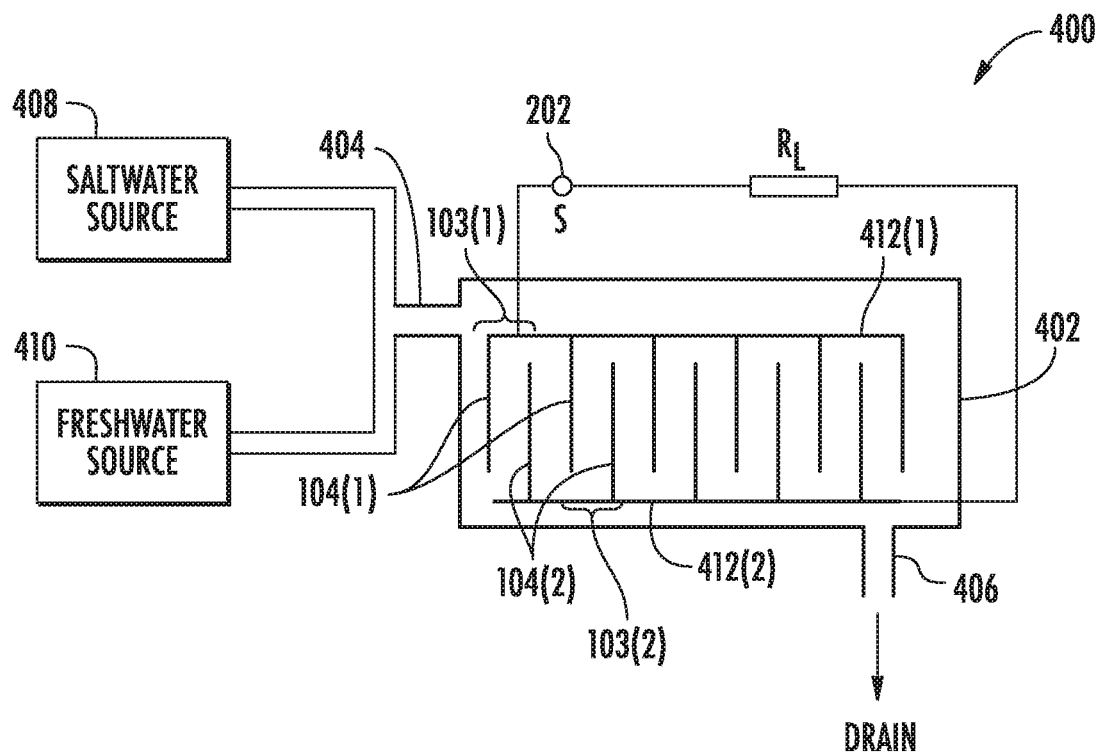
FIG. 4A is a diagram illustrating an energy generation system with asymmetrically porous electrode pairs electrically connected in parallel and positioned in one chamber.
Figure 4B:
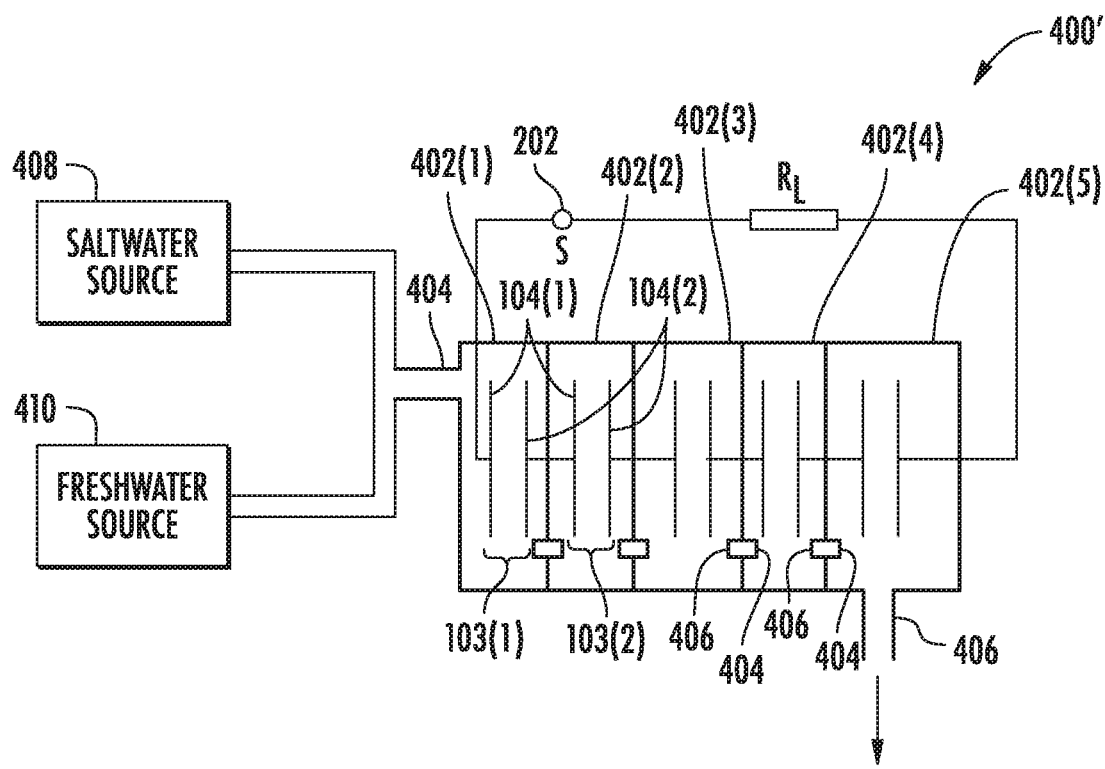
FIG. 4B is a diagram illustrating an energy generation system with asymmetrically porous electrode pairs electrically connected in series and positioned in multiple chambers.
Figure 4C:
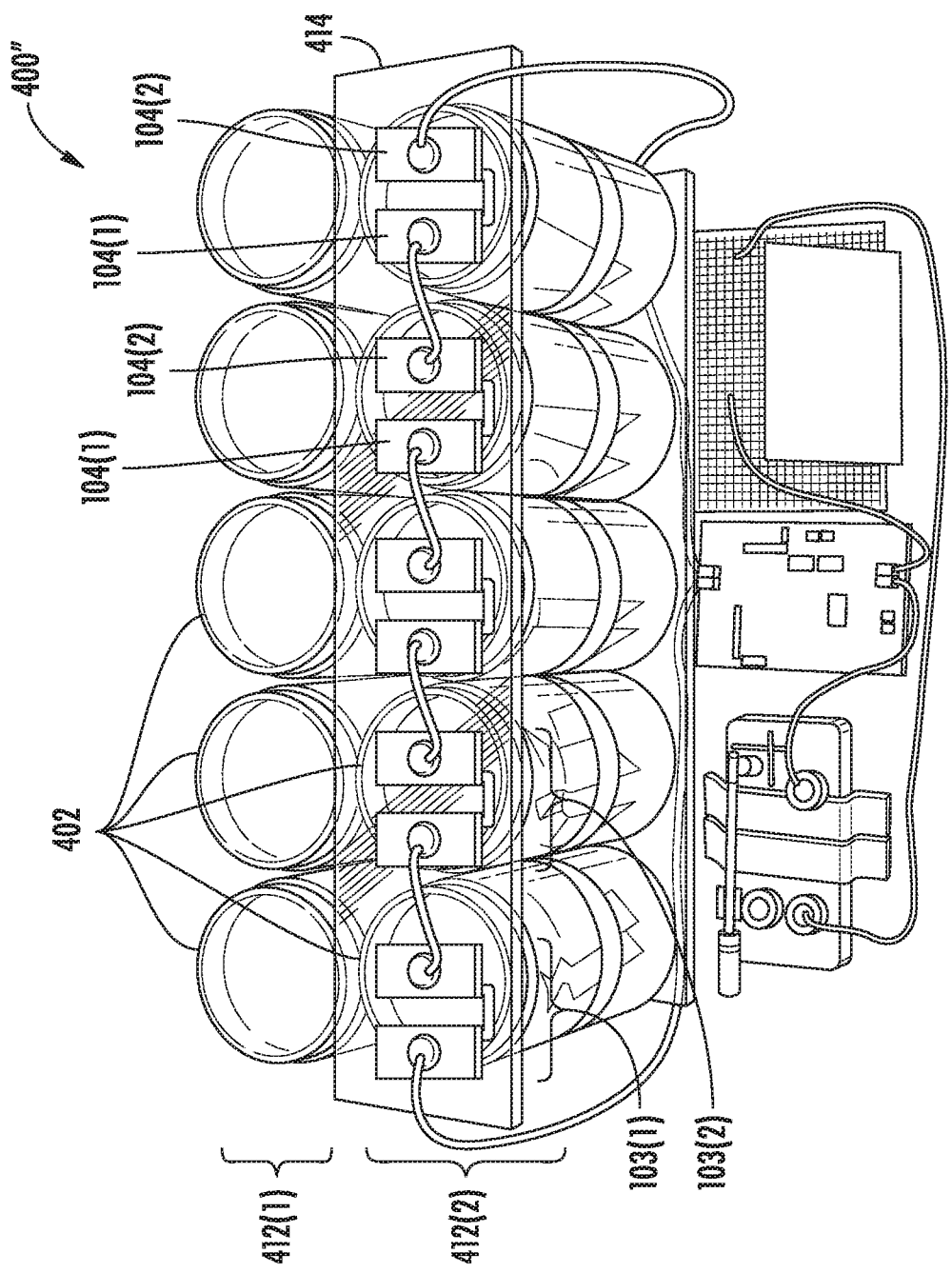
FIG. 4C is a view of an energy generation system with asymmetrically porous electrode pairs electrically connected in parallel and selectively moveable between an array of freshwater chambers and an array of saltwater chambers.

FIGS. 4A-4C are diagrams of energy generation systems using asymmetrically porous electrodes 104(1), 104(2). FIG. 4A is a diagram of an energy generation system 400 including a fluid chamber 402. As used herein, "chamber" is used broadly to refer to a volume that contains and/or directs the flow of fluid. In other words, a chamber may be used for stagnant fluid and/or a continuous fluid flow. As noted above, the system 400 generates electrical power from salinity gradients using asymmetrically porous electrodes. In other words, the system 400 harvests Gibbs free energy (may also be referred to as blue energy) with electrodes with asymmetric pore distributions. The fluid chamber 402 includes an inlet 404 and an outlet 406 (may also be referred to as a drain). The fluid inlet 404 is configured to be in selective fluidic communication with a first solution source 408 (e.g., a saltwater source) of a first salinity and a second solution source 410 (e.g., a freshwater source) of a second salinity that differs from the first salinity. For example, in certain embodiments, the first solution source 408 includes the ocean, and the second solution source 410 includes a freshwater river flowing into the ocean. In certain embodiments, the solution flow is intermittent such that the electrodes 104(1), 104(2) are immersed in stagnant solution. In certain embodiments, the solution flow is continuous such that the electrodes 104(1), 104(2) are immersed in flowing solution.

The energy generation system 400 includes a first array 412(1) of first electrodes 104(1) and a second array 412(2) of second electrodes 104(2) positioned in the fluid chamber 402. The first and second electrodes 104(1), 104(2) are interleaved relative to one another. In other words, portions of the first and second electrodes 104(1), 104(2) are placed alternatingly between each other to form pairs 103(1), 103(2). Thus, the energy generation system 400 includes one or more pairs 103(1), 103(2) of asymmetrically porous electrodes 104(1), 104(2) that are electrically connected in parallel to one another. The first electrode 104(1) includes first nanopores of a first average percent volume per unit pore-width, and the second electrode 104(2) includes second nanopores of a second average percent volume per unit pore-width that differs from the first average percent volume per unit pore-width. Asymmetry between the first average percent volume per unit pore-width and the second average percent volume per unit pore-width is configured to create differing interfacial potentials between the first electrode 104(1) and the second electrode 104(2).

In certain embodiments, the pair 103 of asymmetrically porous electrodes 104(1), 104(2) are not in electrical communication with an external charge source and/or do not include a membrane. In certain embodiments, the electrodes 104(1), 104(2) are carbon electrodes (e.g., graphene) and/or have nanopores. In certain embodiments, the electrodes 104(1), 104(2) include graphite on a substrate of a first polymeric material (e.g., polyethylene terephthalate (PET)) and a binder of a second polymeric material (e.g., 10 wt % polytetrafluoroethylene (PTFE)). In certain embodiments, the first electrode and the second electrode 104(1), 104(2) each include carbon materials of average pore widths larger than a first Debye length of a first solution (e.g., a saltwater solution) from the first solution source 408 and smaller than a second Debye length of a second solution (e.g., a freshwater solution) from the second solution source 410 (e.g., average pore widths between 0.5 nm and 33 nm). Such a configuration imposes a strong, pore-size dependent effect on the interfacial potential associated with the electrical double layers (EDLs) that spontaneously form within the pores.

The energy generation system 400 includes a switch S to selectively complete an electrical circuit between the first electrode 104(1) and the second electrode 104(1). In certain embodiments, the switch S is electrically operated. In certain embodiments, the switch S is manually operated. In certain embodiments, the switch S includes a solenoid.

FIG. 4B is an energy generation system 400' similar to the energy generation system 400 of FIG. 4A. However, the energy generation system 400' of FIG. 4B includes a plurality of chambers 402(1)-402(5), each with their own inlet 404 and outlet 406 and in fluid communication with one another. In this way, fluid flows into and out of each of the chambers 402, and the second fluid inlet 404 is configured to be in selective fluidic communication with the first solution source 408 and the second solution source 410. Further, the energy generation system 400' includes pairs 103(1), 103(2) of asymmetrically porous electrodes 104(1), 104(2) positioned in each chamber 402 and electrically connected in series. Accordingly, the plurality of chambers 402(1)-402(5) are selectively fluidically and electrically isolated from one another.

FIG. 4C is an energy generation system 400" including a plurality of chambers 402 fluidically isolated from each other. The energy generation system 400" includes a first array 412(1) of chambers 402 of a first solution and a second array 412(2) of chambers 402 of a second solution. The energy generation system 400" includes pairs 103(1), 103(2) of asymmetrically porous electrodes 104(1), 104(2) positioned in each chamber 402 and electrically connected in series. The pairs 103(1), 103(2) are selectively moved together between the first array 412(1) and the second array 412(2), such as by being mounted to a common substrate 414.

Figure 5A:
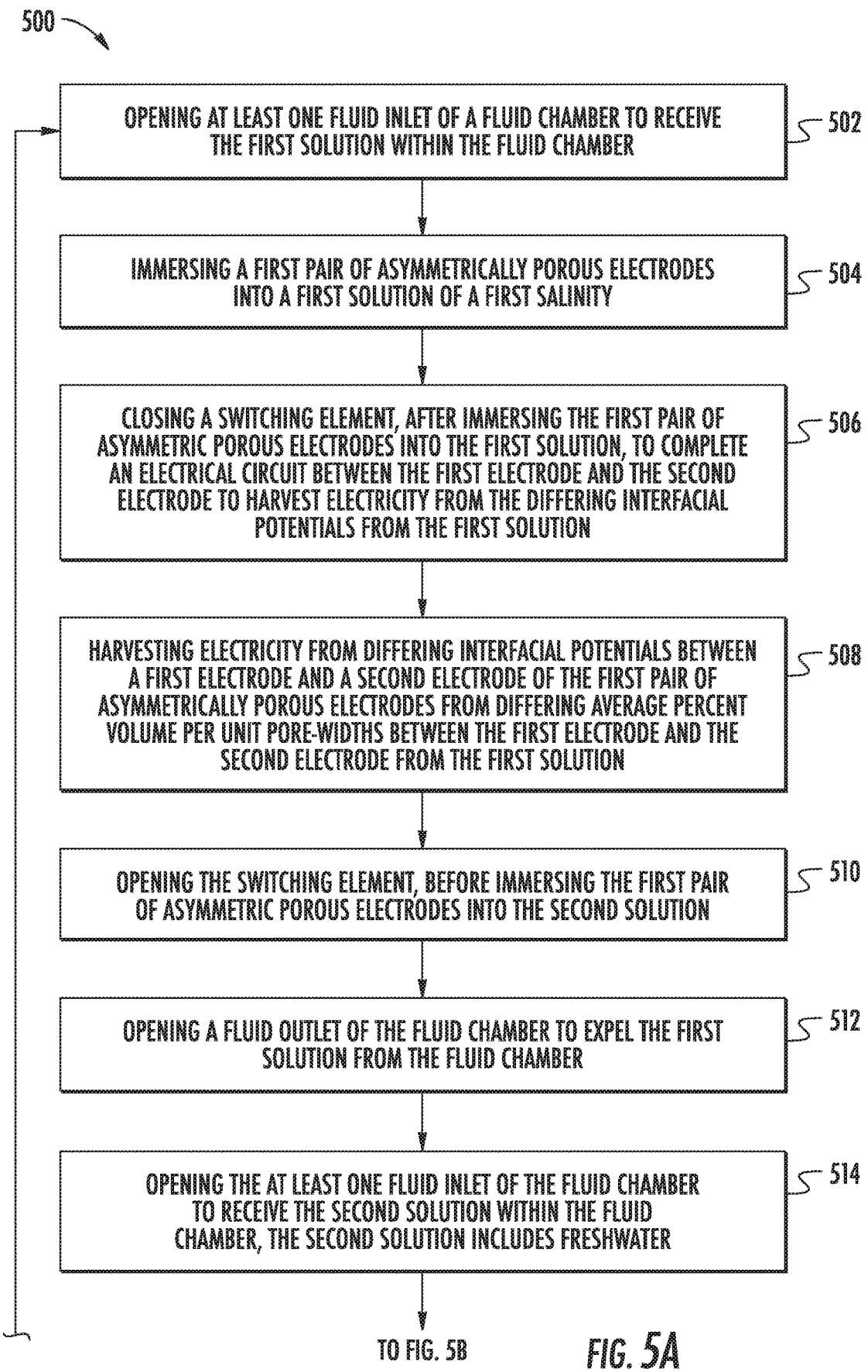
FIG. 5 is a flowchart identifying steps of a method for generating electricity from asymmetrically porous electrodes of an energy generation system.
Figure 5B:
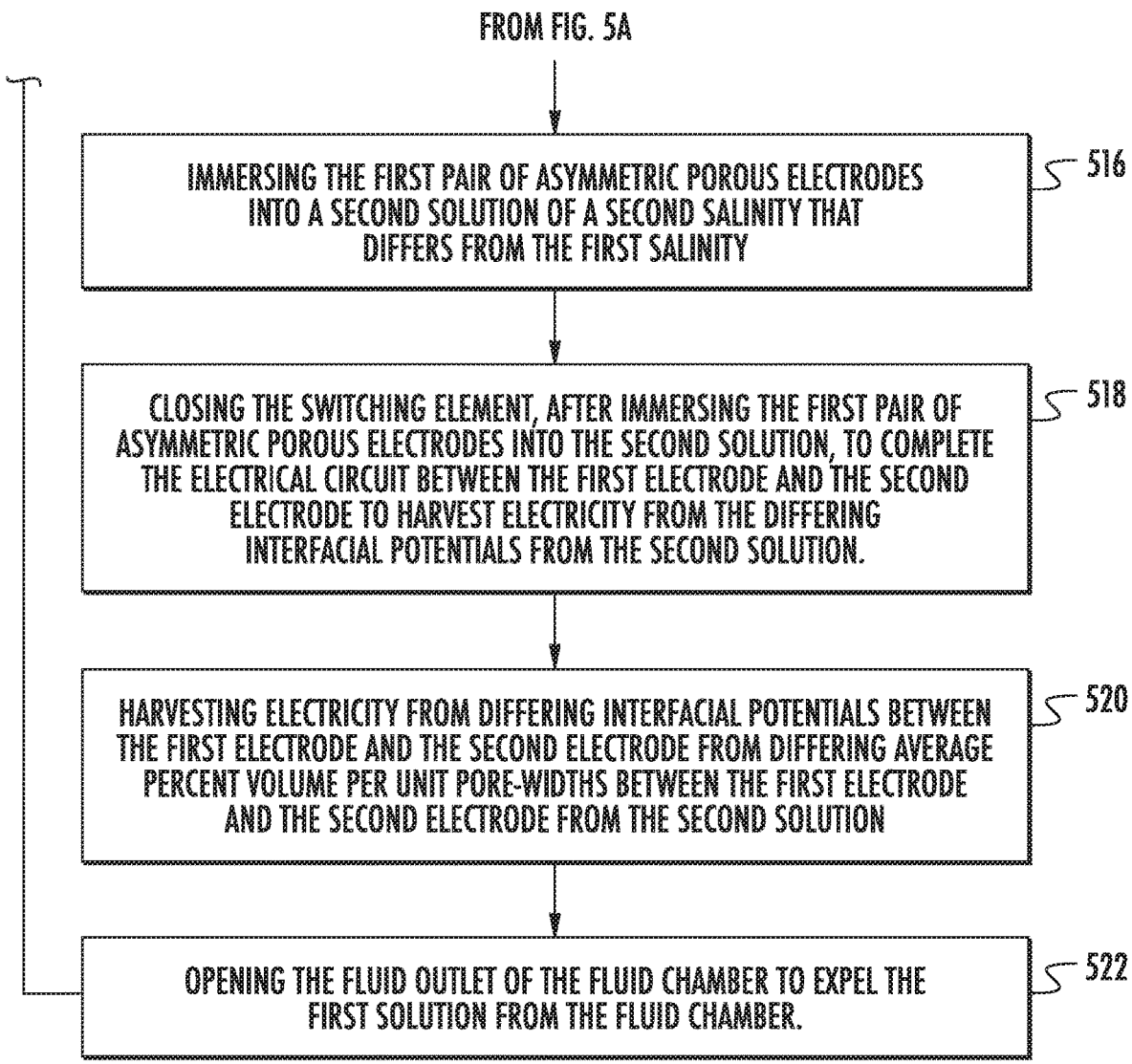

FIG. 5 is a flowchart 500 identifying steps of a method for generating electricity from asymmetrically porous electrodes. In certain embodiments, step 502 includes opening at least one fluid inlet of a fluid chamber to receive a first solution within the fluid chamber. In certain embodiments, the first solution includes saltwater. In certain embodiments, step 504 includes immersing a first pair of asymmetrically porous electrodes into a first solution of a first salinity. In certain embodiments, immersing the first pair of asymmetric porous electrodes in the first solution further comprises immersing a second pair of asymmetric porous electrodes in the first solution, the second pair of asymmetric porous electrodes connected in series to the first pair of asymmetric porous electrodes.

In certain embodiments, step 506 includes closing a switching element after immersing the first pair of asymmetric porous electrodes into the first solution to complete an electrical circuit between the first electrode and the second electrode to harvest electricity from the differing interfacial potentials from the first solution. In certain embodiments, step 508 includes harvesting electricity from differing interfacial potentials between a first electrode and a second electrode of the first pair of asymmetrically porous electrodes from differing average percent volume per unit pore-widths between the first electrode and the second electrode from the first solution.

In certain embodiments, step 510 includes opening the switching element before immersing the first pair of asymmetric porous electrodes into the second solution. In certain embodiments, step 512 includes opening a fluid outlet of the fluid chamber to expel the first solution from the fluid chamber.

In certain embodiments, step 514 includes opening the at least one fluid inlet of the fluid chamber to receive the second solution within the fluid chamber. In certain embodiments, the second solution includes freshwater. In certain embodiments, step 516 includes immersing the first pair of asymmetric porous electrodes into a second solution of a second salinity that differs from the first salinity. In certain embodiments, immersing the first pair of asymmetric porous electrodes in the second solution further comprises immersing the second pair of asymmetric porous electrodes in the second solution.

In certain embodiments, step 518 includes closing the switching element, after immersing the first pair of asymmetric porous electrodes into the second solution, to complete the electrical circuit between the first electrode and the second electrode to harvest electricity from the differing interfacial potentials from the second solution. In certain embodiments, step 520 includes harvesting electricity from differing interfacial potentials between the first electrode and the second electrode from differing average percent volume per unit pore-widths between the first electrode and the second electrode from the second solution.

In certain embodiments, step 522 includes opening the fluid outlet of the fluid chamber to expel the first solution from the fluid chamber.

In certain embodiments, the method includes cyclically repeating the steps of immersing the first pair of asymmetric porous electrodes in the first solution, harvesting electricity from the first solution, immersing the first pair of asymmetric porous electrodes in the second solution, and harvesting electricity from the second solution.

In certain embodiments, the first electrode comprises graphite on a substrate of a first polymeric material and comprises a binder of a second polymeric material. In certain embodiments, the first electrode and the second electrode each comprise carbon materials of average pore widths between 0.5 nm and 33 nm. In certain embodiments, the first electrode and the second electrode each comprise carbon materials of average pore widths larger than a first Debye length of the first solution (e.g., saltwater) from a first solution source and smaller than a second Debye length of the second solution (e.g., freshwater) from a second solution source. In certain embodiments, the first pair of asymmetrically porous electrodes are not in electrical communication with an external charge source.

FIGS. 6A-11 provide data and charts relating to a series of experiments and measurements illustrating use of asymmetrically porous electrodes and variations thereof. These experiments are merely illustrative of the features of the energy generation system disclosed herein. Associated measurements may include pore-size distribution (e.g., using Quantachrome Instruments®), cyclic voltammetry experiments (e.g., using Gamry® Interface 5000E), voltages (e.g., using Tektronix® DPO3034). In certain embodiments, electrodes were immersed in deionized water overnight prior to experiments. In certain embodiments, experiments were performed under 1 atm at room temperature.

Figure 6A:
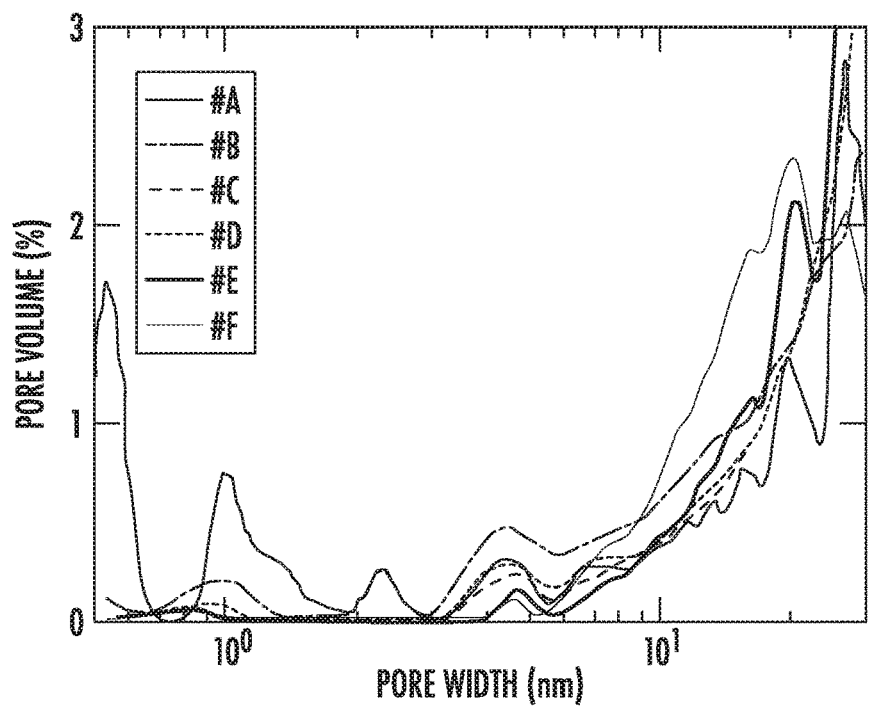
FIG. 6A is a graph illustrating pore width as a function of pore volume for each of several nanoporous carbon materials.
Figure 6B:
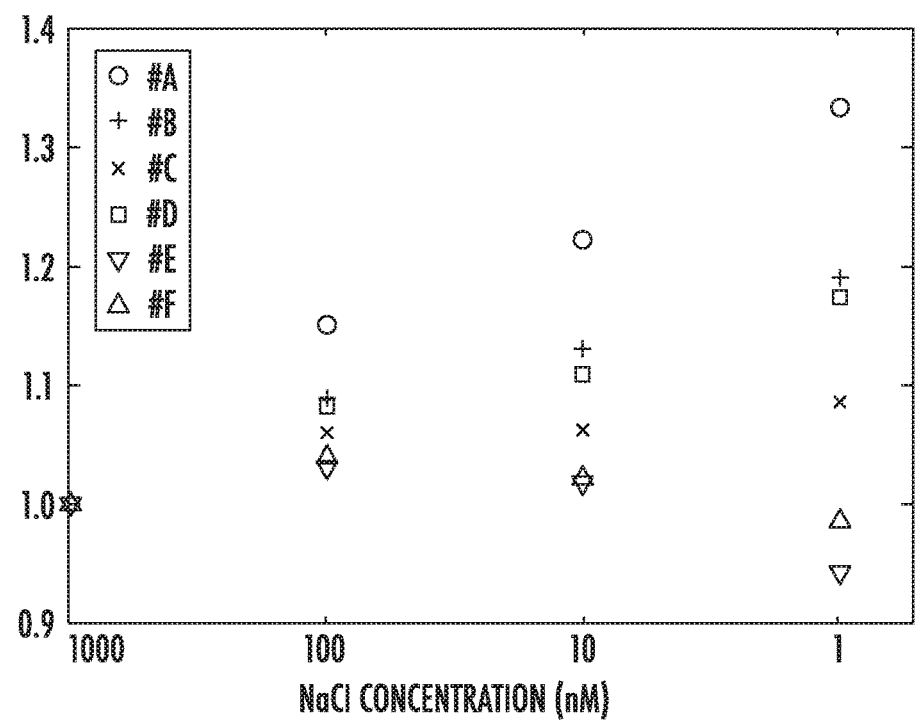
FIG. 6B is a graph illustrating potential difference ratio of several nanoporous carbon materials after four hours of immersing different concentrations of an NaCl solution.

Referring to FIGS. 6A-6B, as an example, responses of six carbon electrodes were subjected to different concentration gradients of sodium chloride solutions. The electrodes (1×2.5 in² each) were fabricated with carbon materials of pore widths between 0.5 nm and 33 nm.

The carbon materials (e.g., of Carbon Nanotubes Plus®) include aqueous suspensions of carbon nanotubes (CNTs) prepared by sonicating the CNTs in deionized water with a probe sonicator (e.g., for 40 minutes). In certain embodiments, each carbon electrode was prepared by directly coating the CNT suspended solution on a current collector, such as a graphite foil (e.g., Panasonic®). In certain embodiments, polyethylene terephthalate (PET) was used as the substrate of the electrode. In certain embodiments, 10 wt % polytetrafluoroethylene (PTFE) binder was added to the suspension of carbon #f for improved bonding. In certain embodiments, the mass for #a and #f in the experiments were selected to be 5.9 mg and 14.3 mg, respectively.

Table 1 below indicates specifications of six commercially available carbon materials used.

TABLE 1

| Carbon # | Outside Diameter (nm) | Length (μm) |
|---|---|---|
| #a | <2 | 5-30 |
| #b | 1-2 | 5-30 |
| #c | <8 | 10-30 |
| #d | 10-20 | 10-30 |
| #e | 8-15 | 0.5-2 |
| #f | 20-30 | 0.5-2 |

FIG. 6A illustrates pore width as a function of pore volume for each of the six carbon electrodes. Each electrode was subjected to three concentration gradients generated by sodium chloride solutions, including 1-0.1 M (1000-100 mM), 1-0.01 M (1000-10 mM), and 1-0.001 M (1000-1 mM). For every pair of solutions, the electrodes were first immersed in the 1 M solution for eight hours and then in the solution of the lower concentration for eight hours.

FIG. 6B illustrates the measured voltages at the eight-hour mark normalized against that corresponding to the 1 M solution. The reduction in surface charge density appears to be the same for all electrodes under the same concentration gradient. If every electrode behaved as a planar electrode (i.e., if the pore sizes did not have an impact on capacitance change), the normalized voltages of all electrodes would be the same for any of the gradients because the gradient would introduce the same capacitance changes to all electrodes. Accordingly, the obtained divergent relationships indicate a strong dependence of the capacitance change on the pore sizes of the electrode, as characterized by the average percent volume per unit width, $\tau$, as indicated in Tables 2-4 below.

Table 2 provides an estimated original EDL length versus the ion concentration change of NaCl solution.

TABLE 2

| Ion concentration (mM) | Debye length (nm) |
|---|---|
| 1000 | 0.3 |
| 100 | 0.95 |
| 10 | 3.04 |
| 1 | 9.49 |

Table 3 provides an average percent volume ($\bar{\phi}$) and average pore size ($\bar{w}$) of affected pores (0.5 nm-$\lambda_{D2}$) during the change of ion concentration.

TABLE 3

| | 1000-100 ($\lambda_{D2}$ = 0.95 nm) | | 1000-100 ($\lambda_{D2}$ = 3.04 nm) | | 1000-100 ($\lambda_{D2}$ = 9.49 nm) | |
|---|---|---|---|---|---|---|
| c(mM) Carbon # | average pore (nm) | volume (%) | average pore (nm) | volume (%) | average pore (nm) | volume (%) |
| #a | 0.6 | 15.5 | 0.9 | 26.6 | 2.4 | 36.8 |
| #b | 0.7 | 2.1 | 1.0 | 4.9 | 5.0 | 23.4 |
| #c | 0.7 | 1.1 | 0.7 | 1.1 | 5.8 | 10.2 |
| #d | 0.8 | 1.1 | 0.9 | 1.5 | 5.6 | 12.9 |
| #e | 0.8 | 0.5 | 0.8 | 0.5 | 6.7 | 5.9 |
| #f | 0.8 | 0.5 | 0.8 | 0.5 | 7.2 | 8.9 |

Table 4 provides an average percent volume per unit width ($\tau$) for pores with a width between 0.5 nm and $\lambda_{D2}$.

TABLE 4

| | c(mM) | | |
|---|---|---|---|
| Carbon # | 1000-100 ($\lambda_{D2}$ = 0.95 nm) | 1000-10 ($\lambda_{D2}$ = 3.04 nm) | 1000-1 ($\lambda_{D2}$ = 9.49 nm) |
| #a | 26.3 | 28.5 | 15.4 |
| #b | 2.8 | 4.9 | 4.7 |
| #c | 1.4 | 1.4 | 1.7 |
| #d | 1.4 | 1.7 | 2.3 |
| #e | 0.7 | 0.7 | 0.9 |
| #f | 0.6 | 0.7 | 1.2 |

For example, the normalized voltages of samples #e and #f are similar for the 1 M-0.1 M and 1 M-0.01 M pairs because of the similarity in the distributions of the pores with a width smaller than the respective Debye lengths. For the 1 M-0.1 M pair, $\tau$=0.7 and $\tau$=0.6 for #e and #f, respectively, and $\tau$=0.7 for both samples for the 1 M-0.01 M pair. The normalized voltage of #f is noticeably higher for the 1 M-0.001 M pair due to a much higher value of $\tau$, i.e., $\tau$=0.9 and $\tau$=1.2 for #e and #f, respectively. On the other extreme of the spectrum, the normalized voltages of #a are the highest in all solution pairs due to its largest values of $\tau$, i.e., $\tau$=26.3, 28.5, 15.4 for the three cases, respectively.

Figure 7A:
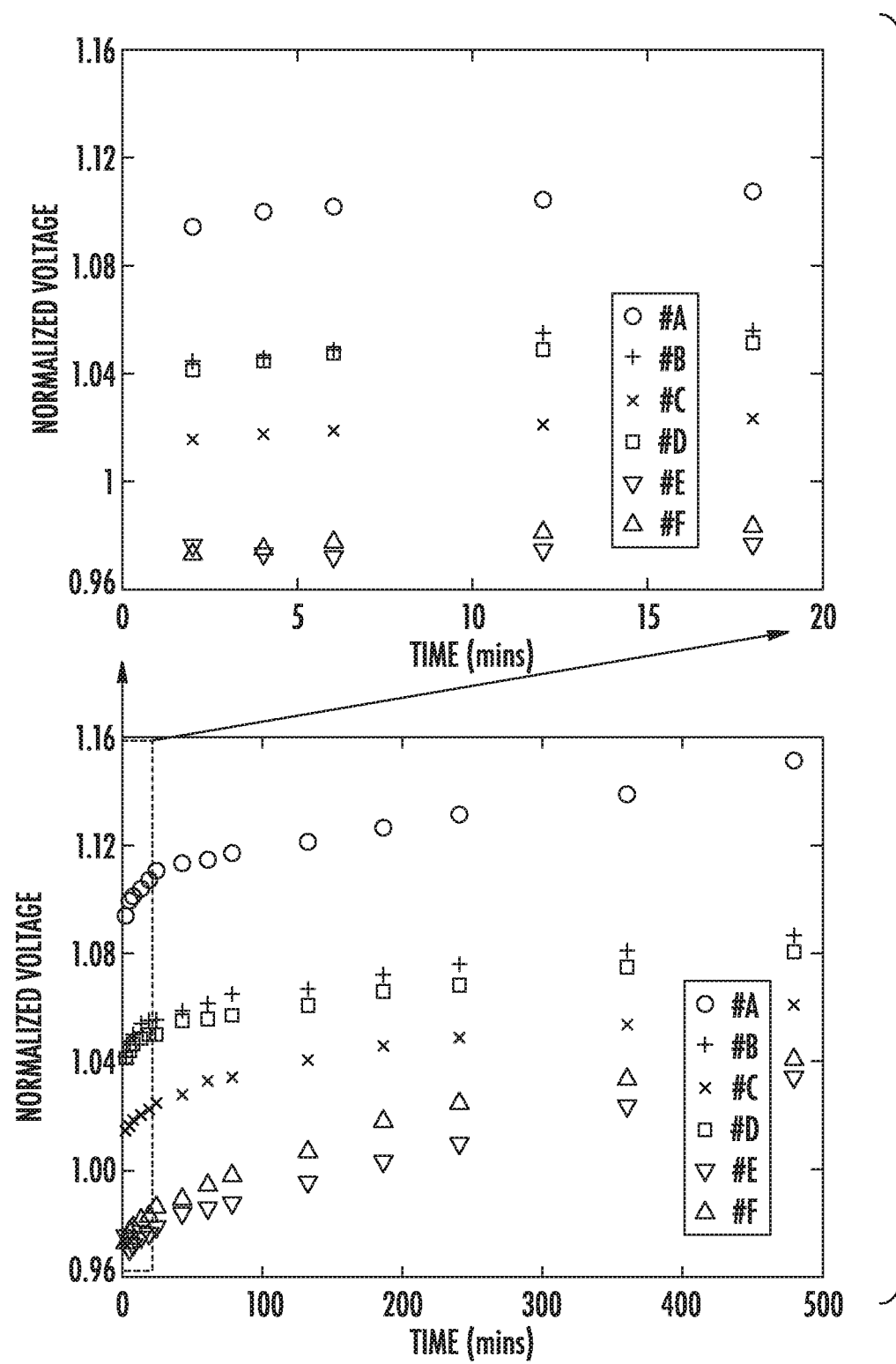
FIG. 7A is a graph illustrating interfacial potentials of carbon nanoporous electrodes from 1000 mM to 100 mM in the first eight hours.
Figure 7B:
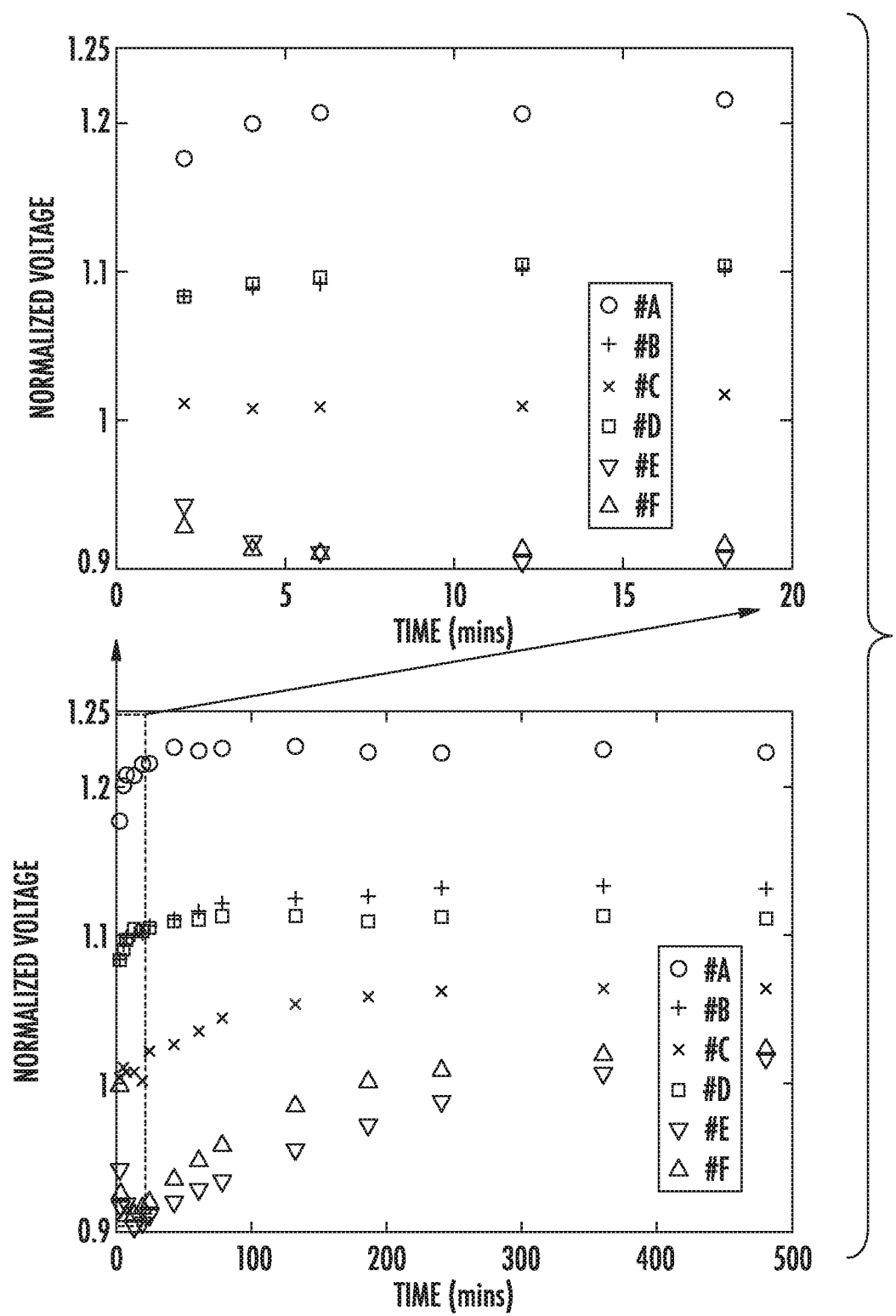
FIG. 7B is a graph illustrating interfacial potentials of carbon nanoporous electrodes from 1000 mM to 10 mM in the first eight hours.
Figure 7C:
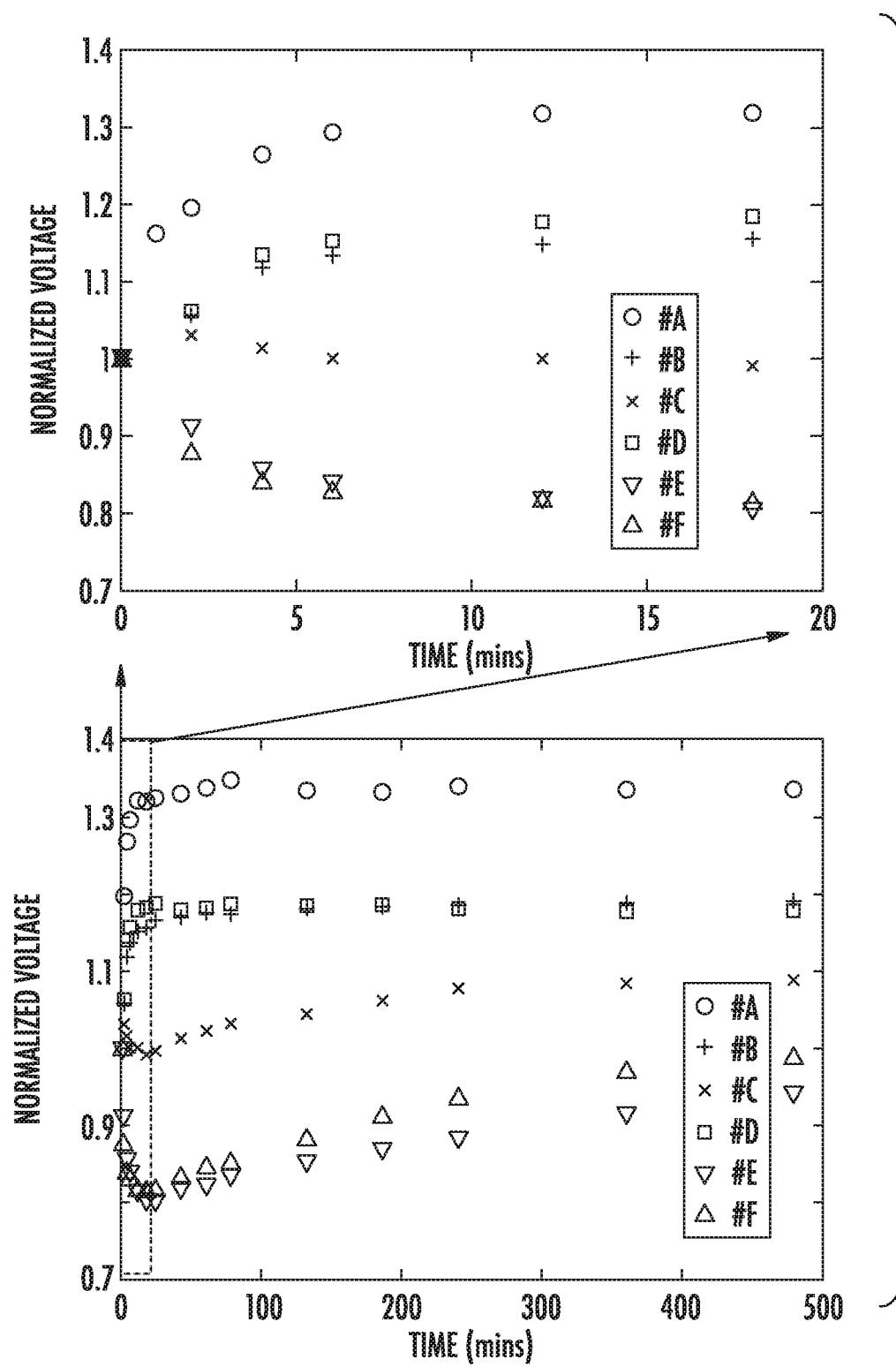
FIG. 7C is a graph illustrating interfacial potentials of carbon nanoporous electrodes from 1000 mM to 1 mM in the first eight hours.

Referring to FIGS. 7A-7C, the strong correlation between the normalized voltages and nanopore distributions as characterized by T is consistent with the time histories obtained experimentally. FIG. 7A illustrates time histories of interfacial potentials of carbon nanoporous electrodes from 1000 mM to 100 mM in the first eight hours. FIG. 7B illustrates time histories of interfacial potentials of carbon nanoporous electrodes from 1000 mM to 10 mM in the first eight hours. FIG. 7C illustrates time histories of interfacial potentials of carbon nanoporous electrodes from 1000 mM to 1 mM in the first eight hours.

Figure 8A:
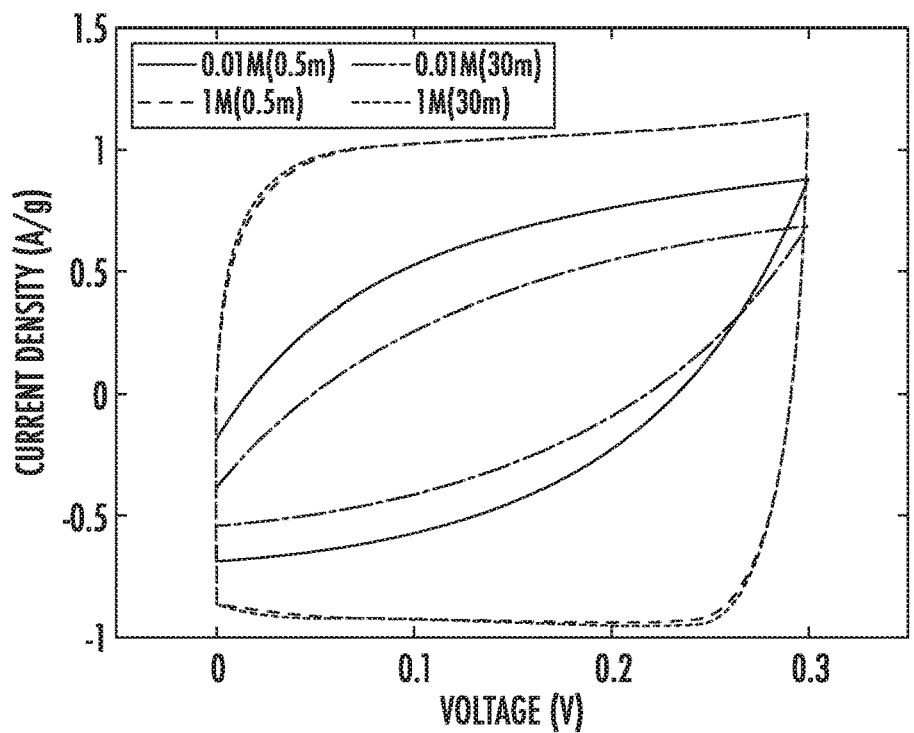
FIG. 8A is a graph illustrating cyclic voltammetry of carbon #a from 1000 mM to 10 mM versus time.
Figure 8B:
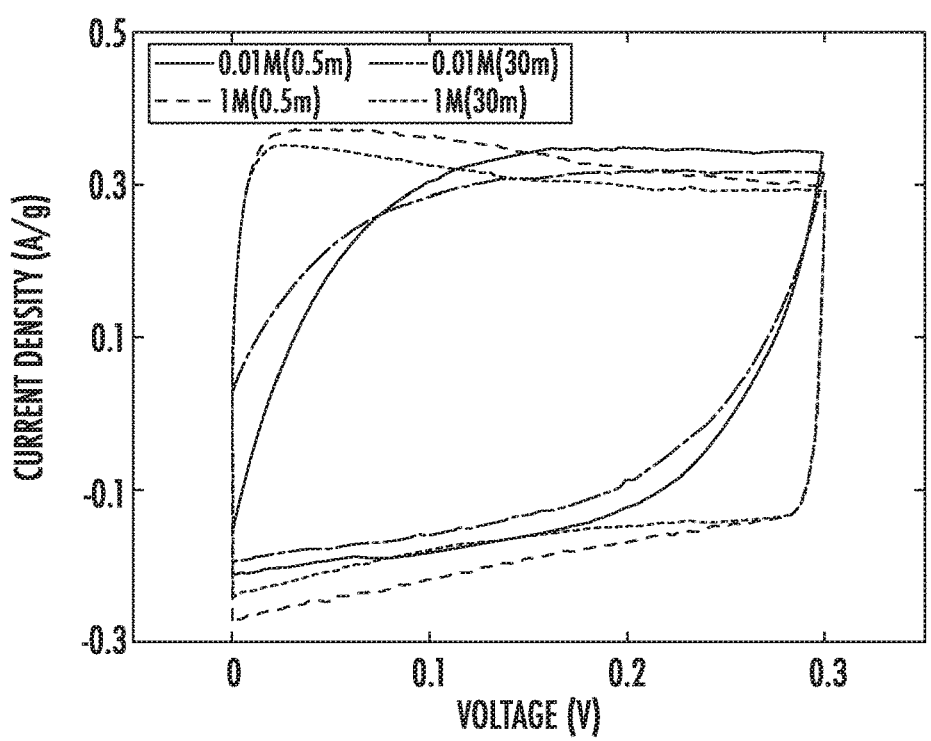
FIG. 8B is a graph illustrating cyclic voltammetry of carbon #e from 1000 mM to 10 mM versus time.
Figure 8C:
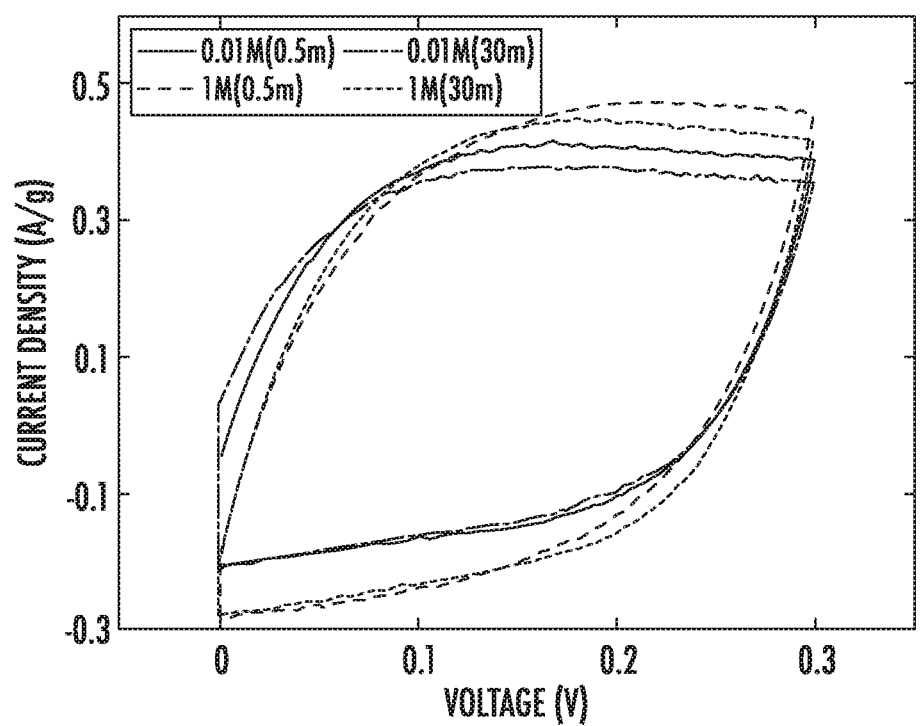
FIG. 8C is a graph illustrating cyclic voltammetry of carbon #f from 1000 mM to 10 mM versus time.

The nanopore-size effect has been confirmed with cyclic voltammetry experiments. As illustrated in FIGS. 8A-8C, when moved from a high concentration (1 M) to a lower one (0.01 M), a greater capacitance reduction is observed from a sample of a higher value of τ. FIG. 8A illustrates results from cyclic voltammetry (20 mV/s) of carbon #a from 1000 mM to 10 mM versus time. FIG. 8B illustrates results from cyclic voltammetry (20 mV/s) of carbon #e from 1000 mM to 10 mM versus time. FIG. 8C illustrates results from Cyclic voltammetry (20 mV/s) of carbon #f from 1000 mM to 10 mM versus time.

Figure 9A:
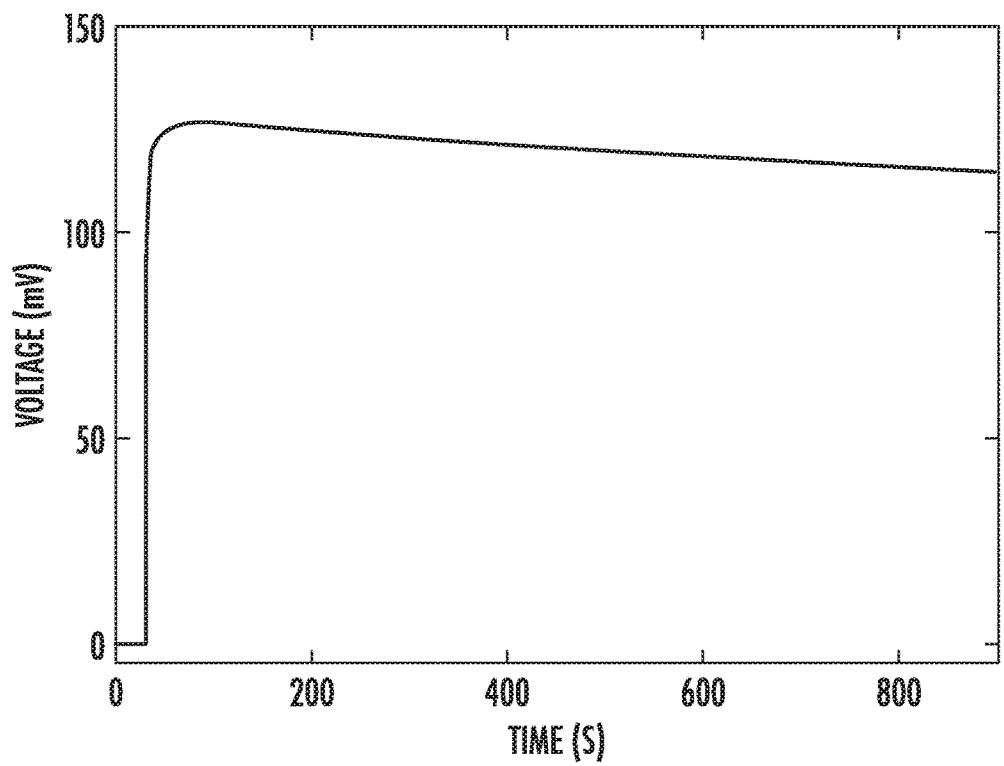
FIG. 9A is a graph illustrating time history of potential difference when the asymmetrically porous electrodes of FIG. 4C are switched from 0.01 M to 0.6 M and experience a salinity gradient.
Figure 9B:
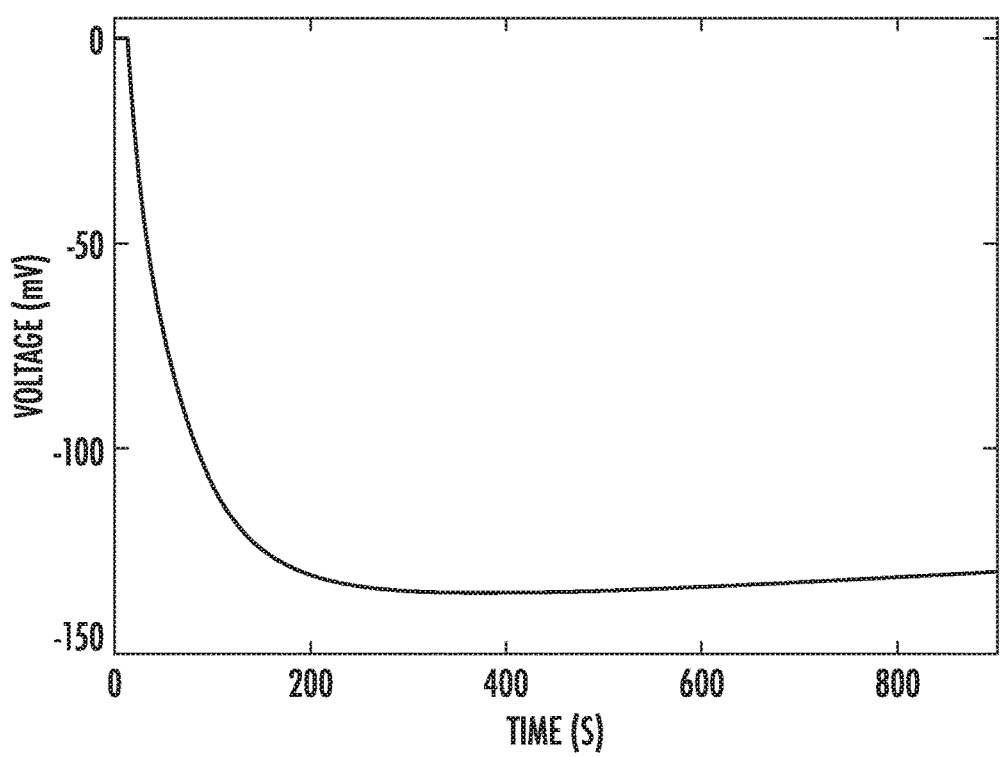
FIG. 9B is a graph illustrating time history of potential difference when the asymmetrically porous electrodes of FIG. 4C are switched from 0.6 M to 0.1 M and experience a salinity gradient.

FIGS. 9A-9B illustrate passive mixing of seawater and river water, the concentrations of which are respectively assumed to be 0.6 M and 0.01 M. FIG. 9A illustrates time histories of the potential difference between two electrodes (#a and #f) when the device of FIG. 4C is experiencing a salinity gradient from 0.01 M to 0.6 M. FIG. 9B illustrates time histories of the potential difference between two electrodes (#a and #f) when the device of FIG. 4C is experiencing a salinity gradient from 0.6 M to 0.01 M.

Carbon materials #a and #f have been used to fabricate the electrodes (e.g., as they provide the largest potential difference among materials #a-#f). A resistor $R_L = 4.0\Omega$ is used for energy takeout for illustrative purposes. Without loss of generality, assume one cycle of the process starts with the electrodes being immersed in the seawater (FIG. 9A), referred to hereafter as the seawater stage. Because of the stronger size effect of carbon material #a, the capacitance of the EDL at electrode #a increases more significantly than that of the EDL at electrode #f, causing the potential of electrode #a to drop more than that of electrode #f. Upon closing the circuit, a current flows through $R_L$ from electrode #f to #a.

After the discharging process, the circuit is switched open and the electrodes are then immersed in the river water (FIG. 9B), referred to hereafter as the river-water stage. The mixing of the seawater in the pores with the ambient river water reduces the capacitance of the EDL at electrode #a more than it does to electrode #f, resulting in a higher electrical potential on electrode #a. A current in the opposite direction is generated when the circuit is closed. Mixing progresses faster in the seawater stage.

Figure 10:
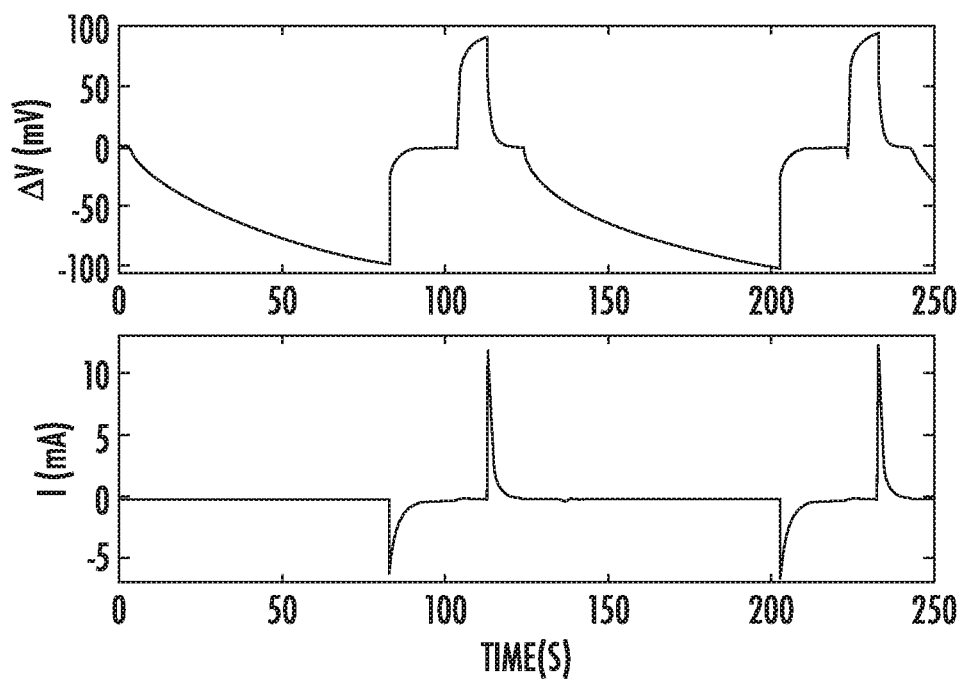
FIG. 10 is graph illustrating electrical potential difference and discharging current of asymmetrically porous carbon electrodes versus time.
Figure 11:
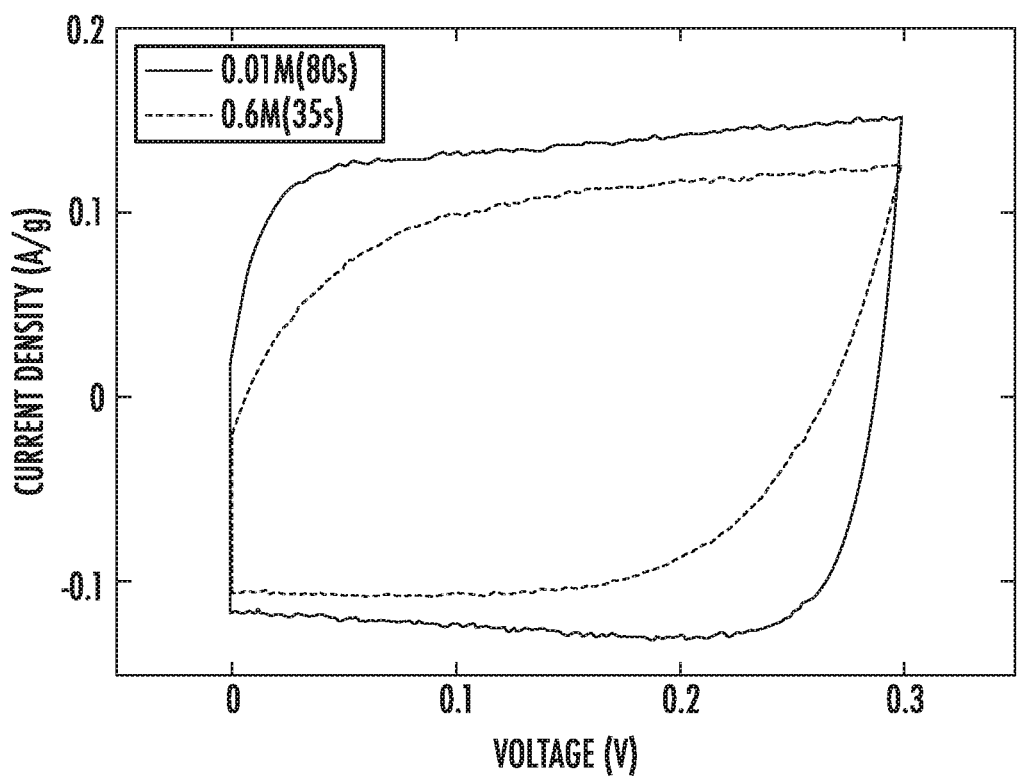
FIG. 11 is a graph illustrating capacitance of two asymmetrically porous carbon electrodes versus time.

FIG. 10 illustrates experimental results including electrical potential difference generated and discharging current from harvesting Gibbs free energy using two nanoporous carbon electrodes with asymmetric nanopore-size distributions. In certain embodiments, the mixing times have been selected to ensure that the majority of the Gibbs free energy is released while a high power output can be achieved, i.e., $t_1=10$ seconds for the seawater stage and $t_2=80$ seconds for the river-water stage. The internal resistances of the capacitors have been identified to be 3.3Ω and 11.1Ω for the seawater stage and the river-water stage, respectively. The discharging times have been selected as $t_{dis,1}=10$ seconds and $t_{dis,2}=20$ seconds. The open circuit potential difference is 94.2 mV in the seawater stage, giving the maximum discharging current of 12.4 mA for the 4Ω resistive load. The open circuit potential difference is 100.8 mV in the river-water stage with the peak current of 6.7 mA.

Debye lengths may be calculated using $$\lambda_D = \sqrt{\frac{\epsilon_\gamma \epsilon_0 k_B T}{2ce^2}},$$

where $k_B$ is the Boltzmann constant, T the temperature, c the concentration, and $e=1.6\times10^{-19}$ coulombs is the elemental charge. The energy dissipated through the electrical load (4.0Ω) may be calculated by numerically integrating the time histories shown in FIG. 2, i.e., $E_1=0.36$ mJ and $E_1=0.20$ mJ. The total electrical energy dissipated was calculated as $E_{d1}=E_1(R_1+R_L)/R_L=0.65$ mJ for the seawater stage and $E_{d2}=E_2(R'_f+R_L)/R_L=0.75$ mJ for the river-water stage, where $R_f=3.3\Omega$ and $R'_f=11.1\Omega$ are the internal resistances associated with the seawater and the river-water stages. The times for the voltage across the external load to drop by 95% were 3.5 seconds and 6.5 seconds for the seawater and the river-water stages, respectively. The average power delivered to the load was calculated as $P_1=5.0$ mW/g for the seawater stage and $P_1=1.5$ mW/g for the river-water stage. The power densities without considering the discharging process were calculated as $P'_1=E_{d1}/t_1/m=3.4$ mW/g for the seawater stage and $P'_2=E_{d2}/t_2/m=0.47$ mW/g for the river-water stage, where m=20.2 mg is the total mass of the carbon material. The volumetric power densities were estimated using the density of 2.15 g/cm³ for the carbon materials used.

FIG. 10 illustrates results from cyclic voltammetry experiments (20 mV/s) of the device of FIG. 4C when in different stages. The cyclic voltammetry experiment was conducted to measure the total capacitance of the system when it is in different stages. The total capacitance is approximately 0.1234 F or 6.1 F/g when the electrodes are in seawater for 35 seconds and 0.0874 F or 4.3 F/g when they are in river water for 80 seconds. The total electrical energy generated is in one cycle can be calculated as 1.4 mJ, corresponding to an energy density of 69 mJ/g per cycle. Note that electricity generation and power delivery are separate processes. The average power of electrical energy generation is the upper limit of the average power that can be continuously delivered to a load. Ignoring the discharging process, the power density is 3.4 mW/g for the seawater stage and 0.47 mW/g for the river-water stage. The average power density of a complete cycle is 0.79 mW/g.

As noted above, in certain embodiments, the energy generation system includes five cells connected in series, such as to power a 2.7-in LCD display (see FIG. 4C above). In certain embodiments, in the seawater stage, the device can drive the LCD display for at least two minutes.

Comparing performance of the disclosed energy generation system, the maximum achievable volumetric power density for RED is 0.16 kW/m³ and for PRO is 1.1 kW/m³. Even with technological advancements, the maximum achievable power density is projected to reach 4 kW/m³ for PRO. Comparatively, the power density of the energy generation system disclosed with the experimental parameters discussed above is 0.79 mW/g, equivalent to 1.7 kW/m³. For the seawater stage, the energy generation system can reach 3.4 mW/g or 7.3 kW/m³.

In certain embodiments, materials that can achieve a high specific capacitance (e.g., 150 F/g in seawater) with desired nanopore distributions may increase the power density of the generation energy system disclosed herein by 25 fold (e.g., to 42.5 kW/m³ or 183 kW/m³ for the seawater stage). Accordingly, using 0.6 M and 0.01 M sodium chloride (NaCl) solutions and carbon electrodes may provide an energy density of 69 mJ/g and a power density of 1.7 kW/m³, which is higher than that of membrane-based methods. In certain embodiments, in the seawater stage, the power density can reach 7.3 kW/m³.

In certain embodiments, power density may be increased using precise control of nanopore distributions, nano-scale mixing, and/or enhanced ion adsorption. In certain embodiments, pore-size distributions may be optimized for a target concentration gradient. In certain embodiments, the surface charge density may be increased. In certain embodiments, materials of extremely high porosity may be used to allow for more solutions participating in each mixing stage. In certain embodiments, methods that accelerate the nano-scale mixing process may be used.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An energy generation system, comprising:
   a first fluid chamber comprising at least one first fluid inlet and a first fluid outlet, the at least one first fluid inlet configured to be in selective fluidic communication with a first solution source of a first salinity and a second solution source of a second salinity that differs from the first salinity; and
   a first pair of asymmetrically porous electrodes, comprising:
      a first electrode positioned within the first fluid chamber, the first electrode comprising first nanopores of a first average percent volume per unit pore-width; and
      a second electrode positioned within the first fluid chamber, the second electrode comprising second nanopores of a second average percent volume per unit pore-width that differs from the first average percent volume per unit pore-width;
   wherein asymmetry between the first average percent volume per unit pore-width and the second average percent volume per unit pore-width is configured to create differing interfacial potentials between the first electrode and the second electrode.

2. The energy generation system of claim 1, wherein the first solution source comprises a saltwater source, and the second solution source comprises a freshwater source.

3. The energy generation system of claim 1, further comprising a switching element to selectively complete an electrical circuit between the first electrode and the second electrode.

4. The energy generation system of claim 1, further comprising a second pair of asymmetric porous electrodes connected in series to the first pair of asymmetric porous electrodes.

5. The energy generation system of claim 4, further comprising a second fluid chamber comprising a second fluid inlet and a second fluid outlet, the second fluid inlet configured to be in selective fluidic communication with the first solution source and the second solution source.

6. The energy generation system of claim 1, wherein the first electrode comprises graphite on a substrate of a first polymeric material and comprises a binder of a second polymeric material.

7. The energy generation system of claim 1, wherein the first electrode and the second electrode each comprise carbon materials of average pore widths between 0.5 nm and 33 nm.

8. The energy generation system of claim 1, wherein the first electrode and the second electrode each comprise carbon materials of average pore widths larger than a first Debye length of a first solution from the first solution source and smaller than a second Debye length of a second solution from the second solution source.

9. The energy generation system of claim 8, wherein the first solution comprises saltwater, and the second solution comprises freshwater.

10. The energy generation system of claim 1, wherein the first pair of asymmetrically porous electrodes are not in electrical communication with an external charge source.

11. A method of energy generation, comprising:
    immersing a first pair of asymmetrically porous electrodes into a first solution of a first salinity;
    harvesting electricity from differing interfacial potentials between a first electrode and a second electrode of the first pair of asymmetrically porous electrodes from differing average percent volume per unit pore-widths between the first electrode and the second electrode from the first solution;
    immersing the first pair of asymmetric porous electrodes into a second solution of a second salinity that differs from the first salinity; and
    harvesting electricity from differing interfacial potentials between the first electrode and the second electrode from differing average percent volume per unit pore-widths between the first electrode and the second electrode from the second solution.

12. The method of claim 11, wherein the first solution comprises saltwater, and the second solution comprises freshwater.

13. The method of claim 11, further comprising:
    opening at least one fluid inlet of a fluid chamber to receive the first solution within the fluid chamber, the first solution including saltwater;
    opening a fluid outlet of the fluid chamber to expel the first solution from the fluid chamber;
    opening the at least one fluid inlet of the fluid chamber to receive the second solution within the fluid chamber, the second solution including freshwater; and
    opening the fluid outlet of the fluid chamber to expel the first solution from the fluid chamber.

14. The method of claim 11, further comprising:
    closing a switching element, after immersing the first pair of asymmetric porous electrodes into the first solution, to complete an electrical circuit between the first electrode and the second electrode to harvest electricity from the differing interfacial potentials from the first solution;
    opening the switching element, before immersing the first pair of asymmetric porous electrodes into the second solution; and
    closing the switching element, after immersing the first pair of asymmetric porous electrodes into the second solution, to complete the electrical circuit between the first electrode and the second electrode to harvest electricity from the differing interfacial potentials from the second solution.

15. The method of claim 11,
wherein immersing the first pair of asymmetric porous electrodes in the first solution further comprises immersing a second pair of asymmetric porous electrodes in the first solution, the second pair of asymmetric porous electrodes connected in series to the first pair of asymmetric porous electrodes; and
wherein immersing the first pair of asymmetric porous electrodes in the second solution further comprises immersing the second pair of asymmetric porous electrodes in the second solution.

16. The method of claim 11, further comprising cyclically repeating the steps of immersing the first pair of asymmetric porous electrodes in the first solution, harvesting electricity from the first solution, immersing the first pair of asymmetric porous electrodes in the second solution, and harvesting electricity from the second solution.

17. The method of claim 11, wherein the first electrode comprises graphite on a substrate of a first polymeric material and comprises a binder of a second polymeric material.

18. The method of claim 11, wherein the first electrode and the second electrode each comprise carbon materials of average pore widths between 0.5 nm and 33 nm.

19. The method of claim 11, wherein the first electrode and the second electrode each comprise carbon materials of average pore widths larger than a first Debye length of the first solution from a first solution source and smaller than a second Debye length of the second solution from a second solution source.

20. The method of claim 11, wherein the first pair of asymmetrically porous electrodes are not in electrical communication with an external charge source.

* * * * *